United States Patent
Kitao et al.

(10) Patent No.: US 11,799,337 B2
(45) Date of Patent: Oct. 24, 2023

(54) ROTATING ELECTRIC MACHINE

(71) Applicant: Mitsubishi Electric Corporation, Tokyo (JP)

(72) Inventors: Junji Kitao, Tokyo (JP); Kosho Yamane, Tokyo (JP); Tomohira Takahashi, Tokyo (JP); Yoshihiro Miyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 492 days.

(21) Appl. No.: 17/056,000

(22) PCT Filed: Feb. 4, 2019

(86) PCT No.: PCT/JP2019/003871
§ 371 (c)(1),
(2) Date: Nov. 17, 2020

(87) PCT Pub. No.: WO2020/017078
PCT Pub. Date: Jan. 23, 2020

(65) Prior Publication Data
US 2021/0218301 A1    Jul. 15, 2021

(30) Foreign Application Priority Data
Jul. 19, 2018    (JP) ................. 2018-135812

(51) Int. Cl.
*H02K 1/27*    (2022.01)
*H02K 21/16*    (2006.01)
(Continued)

(52) U.S. Cl.
CPC ......... *H02K 1/2766* (2013.01); *H02K 1/2791* (2022.01); *H02K 21/16* (2013.01); *H02K 29/03* (2013.01)

(58) Field of Classification Search
CPC ........ H02K 1/02; H02K 21/16; H02K 1/2791; H02K 1/146; H02K 1/2766; H02K 29/03; H02K 2213/03
(Continued)

(56) References Cited

U.S. PATENT DOCUMENTS

| 8,227,952 B2 * | 7/2012 | Shichijoh ............... H02K 1/246 310/156.53 |
| 2003/0178905 A1 * | 9/2003 | Koharagi ............. H02K 1/2766 310/156.38 |

(Continued)

FOREIGN PATENT DOCUMENTS

| JP | 11-178255 A | 7/1999 |
| JP | 11-206046 A | 7/1999 |

(Continued)

OTHER PUBLICATIONS

International Search Report and Written Opinion dated Apr. 23, 2019 for PCT/JP2019/003871 filed on Feb. 4, 2019, 11 pages including English Translation of the International Search Report.

Primary Examiner — Alex W Mok
(74) Attorney, Agent, or Firm — XSENSUS LLP

(57) ABSTRACT

A rotating electric machine including a rotor including a rotor core arranged coaxially with a stator core via an air gap formed between the stator core and the rotor core, and a plurality of permanent magnet groups each forming one magnetic pole, A flux barrier is formed between one set of permanent magnets adjacent to each other in the circumferential direction in each permanent magnet group forming one magnetic pole. A pair of ribs is formed of regions of the rotor core between the flux barrier and the one set of permanent magnets. A first slit is formed in a region of the rotor core on the air gap side in a radial direction of the each permanent magnet group, and an end portion of the first slit (Continued)

on the flux barrier side is positioned between extension lines of the pair of ribs.

16 Claims, 20 Drawing Sheets

(51) Int. Cl.
*H02K 1/276* (2022.01)
*H02K 1/2791* (2022.01)
*H02K 29/03* (2006.01)

(58) Field of Classification Search
USPC .................................................. 310/156.56
See application file for complete search history.

(56) References Cited

U.S. PATENT DOCUMENTS

| | | | | |
|---|---|---|---|---|
| 2010/0244609 | A1* | 9/2010 | Takahata | H02K 1/276 310/156.53 |
| 2011/0260466 | A1* | 10/2011 | Hori | H02K 1/32 310/59 |
| 2012/0200193 | A1* | 8/2012 | Sano | H02K 1/2766 310/216.106 |
| 2013/0140922 | A1* | 6/2013 | Yabe | H02K 1/2706 310/51 |
| 2014/0217849 | A1* | 8/2014 | Soma | H02K 1/2766 310/156.53 |
| 2015/0069874 | A1* | 3/2015 | Iki | H02K 1/274 310/156.11 |
| 2015/0077034 | A1* | 3/2015 | Kaneko | B60L 9/22 318/722 |
| 2015/0108865 | A1* | 4/2015 | Fujisawa | H02K 1/2773 310/156.07 |
| 2015/0171678 | A1* | 6/2015 | Tsutsui | H02K 1/2766 310/156.56 |
| 2015/0171682 | A1* | 6/2015 | Fujisawa | H02K 1/272 310/156.53 |
| 2017/0366076 | A1 | 12/2017 | Kikuchi et al. | |

FOREIGN PATENT DOCUMENTS

| | | |
|---|---|---|
| JP | 2006-304546 A | 11/2006 |
| JP | 2012-23904 A | 2/2012 |
| WO | 2013/160988 A1 | 10/2013 |
| WO | 2016/088698 A1 | 6/2016 |

* cited by examiner

FIG. 7
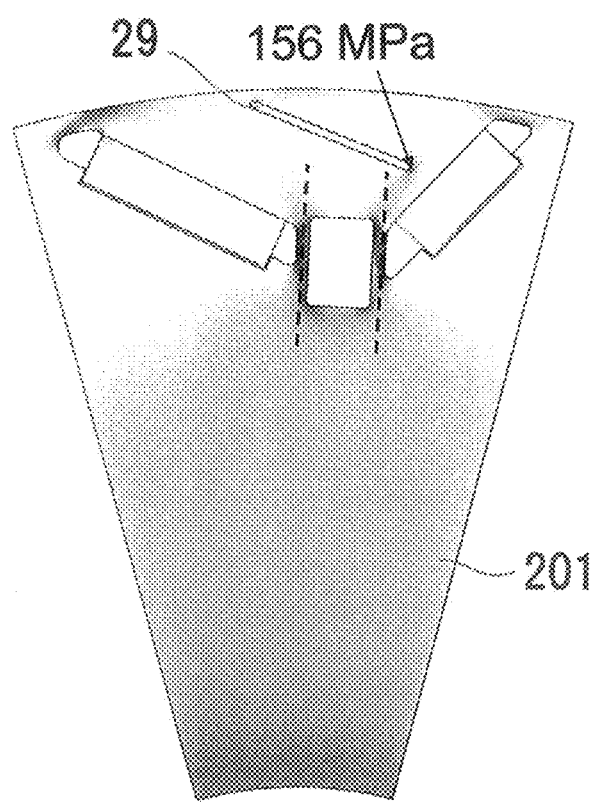
VON MISES STRESS
SMALL  LARGE

ROTATING ELECTRIC MACHINE

CROSS-REFERENCE TO RELATED APPLICATION

The present application is based on PCT filing PCT/JP2019/003871, filed Feb. 4, 2019, which claims priority to JP 2018-135812, filed Jul. 19, 2018, the entire contents of each are incorporated herein by reference.

TECHNICAL FIELD

The present invention relates to a rotating electric machine, and more particularly, to a rotating electric machine including a rotor including permanent magnets.

BACKGROUND ART

A permanent magnet rotating electric machine, which is advantageous in downsizing and increase in output, is adopted in many cases as a rotating electric machine for industrial use and rotating electric machines for an electric vehicle and for a hybrid vehicle. Among the permanent magnet rotating electric machines described above, when the permanent magnet rotating electric machine has such a structure that permanent magnets are embedded in a rotor core, two types of torque can be obtained. Specifically, a magnet torque is generated by a magnet magnetic flux from the permanent magnet, and a reluctance torque is generated by a reluctance magnetic flux caused by a magnetic resistance of the rotor core. A final torque of the rotating electric machine is a combined torque of those two types of torque.

However, the permanent magnet rotating electric machine configured as described above has a feature in that the above-mentioned two types of torque have peak values at different current phase angles. Therefore, a current phase angle at which the combined torque of the two types of torque has a peak value is shifted from the current phase angle at which each of the two types of torque has the peak value. As a result, the peak value of the combined torque of the two types of torque becomes smaller than a sum of the peak values of the two types of torque.

In view of such a situation, there has been proposed a structure in which a slit is formed in a rotor core to cause a magnetic flux flowing from a permanent magnet toward a stator to deviate in a rotating direction of a rotor (for example, Patent Literature 1).

In Patent Literature 1, the slit causes the magnetic flux flowing from the permanent magnet toward the stator to deviate in the rotating direction of the rotor so that the current phase angle at which the magnet torque has the peak value is changed. In this manner, a difference between the current phase angle at which the magnet torque has the peak value and the current phase angle at which the reluctance torque has the peak value is decreased, and thus the peak value of the combined torque of those torques is increased.

CITATION LIST

Patent Literature

[PTL 1] JP 11-206046 A

SUMMARY OF INVENTION

Technical Problem

In Patent Literature 1, the slit for causing the magnetic flux flowing from the permanent magnet toward the stator to deviate in the rotating direction of the rotor is formed in a core region of the rotor core on a radially outer side of the permanent magnet. Therefore, there has been a problem in that, at the time of an operation, a centrifugal force acts on the permanent magnet, and thus a stress generated in a region of the rotor core between the permanent magnet and the slit is increased.

In this case, in order to relax the stress generated in the core region between the permanent magnet and the slit, it has been required to increase the shape of the slit, or to increase an interval between the permanent magnet and the slit. However, when the shape of the slit is increased, the core region for generating the reluctance torque is narrowed, and thus the reluctance torque is decreased. Further, when the interval between the permanent magnet and the slit is increased, the current phase angle at which the magnet torque has the peak value cannot be changed to be close to the current phase angle at which the reluctance torque has the peak value. As a result, in any of those cases, the peak value of the combined torque is decreased.

The present invention has been made to solve the above-mentioned problems, and has an object to provide a rotating electric machine capable of increasing a peak value of a combined torque of a magnet torque and a reluctance torque while reducing a stress generated in a region of a rotor core.

Solution to Problem

A rotating electric machine according to the present invention includes: a stator including a stator core and a stator coil; and a rotor including: a rotor core arranged coaxially with the stator core via an air gap formed between the stator core and the rotor core; and a plurality of permanent magnet groups each forming one magnetic pole, the plurality of permanent magnet groups being embedded in the rotor core and arranged at equiangular pitches in a circumferential direction, wherein a flux barrier is formed between one set of permanent magnets adjacent to each other in the circumferential direction in each permanent magnet group forming one magnetic pole, wherein a pair of ribs is formed of regions of the rotor core between the flux barrier and the one set of permanent magnets adjacent to each other, wherein a first slit for causing a magnetic flux generated from the each permanent magnet group forming one magnetic pole to deviate in a rotating direction of the rotor is formed in a region of the rotor core on the air gap side in a radial direction of the each permanent magnet group forming one magnetic pole, and wherein an end portion of the first slit on the flux barrier side is positioned between extension lines of the pair of ribs.

Advantageous Effects of Invention

According to the present invention, with the above-mentioned configuration, it is possible to achieve the rotating electric machine capable of increasing the peak value of the combined torque while reducing the stress generated in the region of the rotor core.

BRIEF DESCRIPTION OF DRAWINGS

FIG. 7 is a von Mises stress distribution diagram of a stress analysis result in a rotor in Comparative Example.

DESCRIPTION OF EMBODIMENTS

First Embodiment

Figure 1:
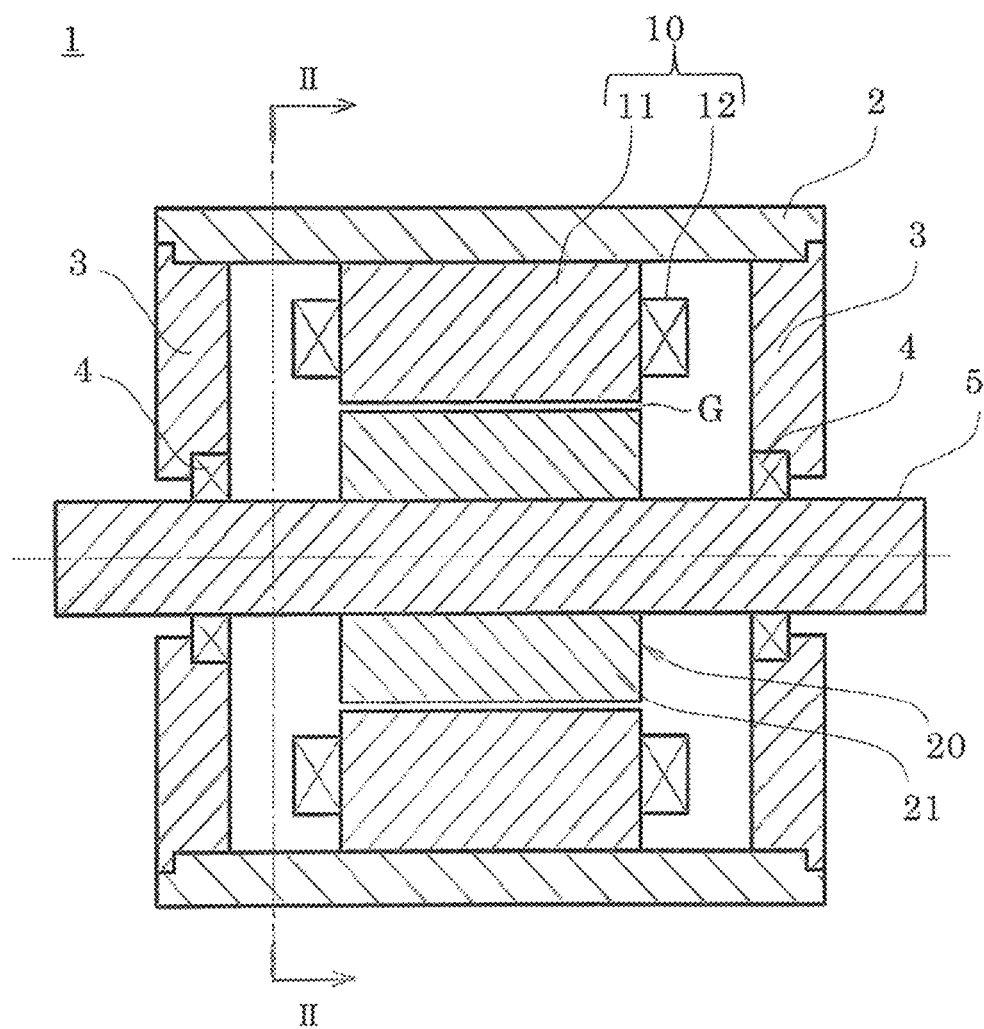
FIG. 1 is a longitudinal sectional view for illustrating a rotating electric machine according to a first embodiment of the present invention.
Figure 2:
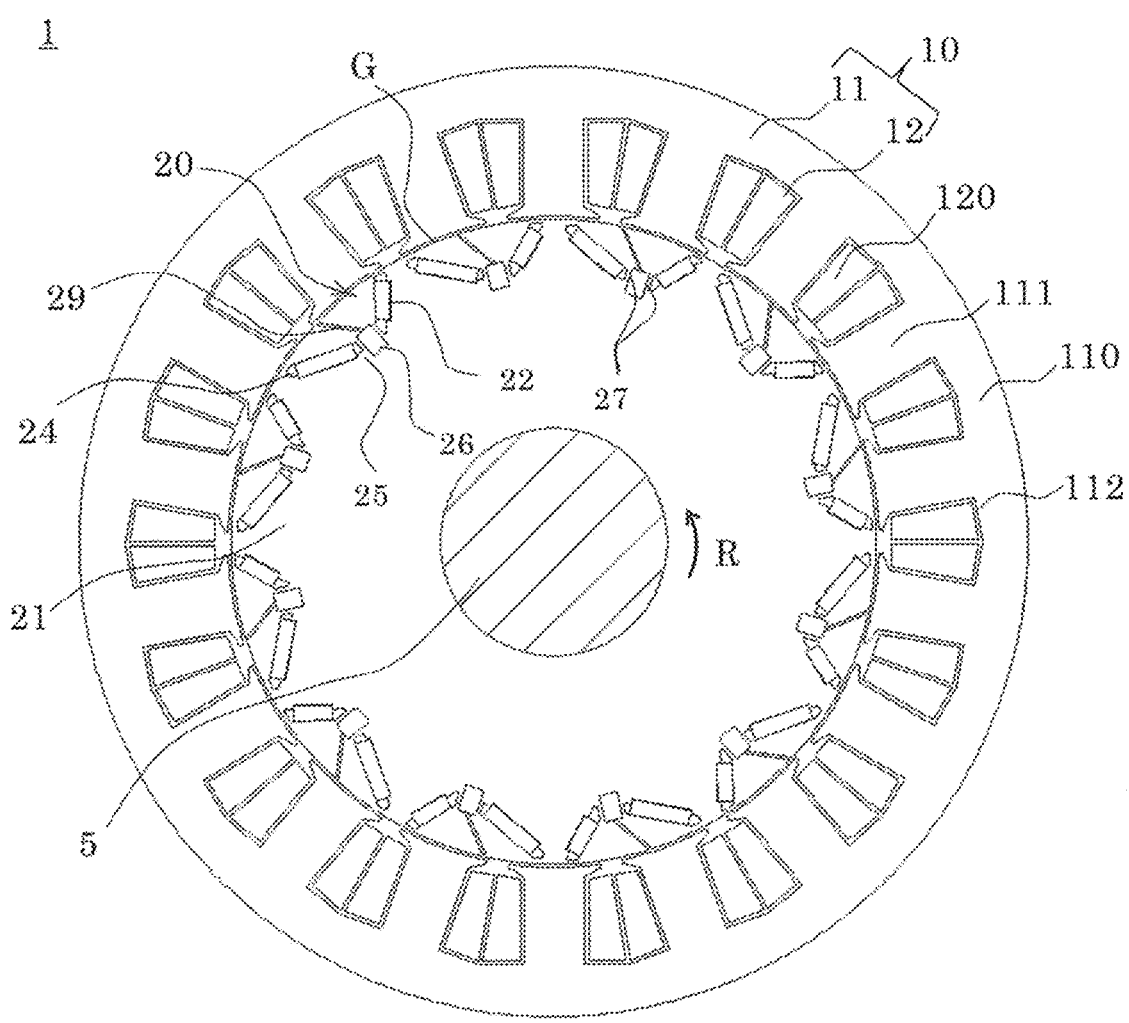
FIG. 2 is a sectional view taken along the arrow line II-II of FIG. 1.

FIG. 1 is a longitudinal sectional view for illustrating a rotating electric machine according to a first embodiment of the present invention. FIG. 2 is a sectional view taken along the arrow line II-II of FIG. 1. A longitudinal sectional view refers to a sectional view for illustrating a cross-section including an axial center of a rotary shaft. In FIG. 2, a frame and coil ends are omitted. Further, in this specification, for the sake of convenience, a direction parallel to the axial center of the rotary shaft is referred to as an "axial direction", a direction orthogonal to the axial center of the rotary shaft about the axial center of the rotary shaft as a center is referred to as a "radial direction", and a direction of rotation about the rotary shaft as a center is referred to as a "circumferential direction". In the drawings, R denotes a rotating direction of the rotary shaft.

In FIG. 1 and FIG. 2, a rotating electric machine 1 includes a cylindrical frame 2, a pair of end plates 3, and a rotary shaft 5. The pair of end plates 3 is mounted to both ends of the frame 2 in the axial direction, and is configured to close openings on both sides of the frame 2 in the axial direction. The rotary shaft 5 is supported by bearings 4 mounted to the pair of end plates 3 so as to be rotatable in the frame 2. The rotating electric machine 1 further includes a rotor 20 and a stator 10. The rotor 20 is firmly fixed to the rotary shaft 5 and provided so as to be rotatable in the frame 2. The stator 10 is inserted into and held by the frame 2, and is provided coaxially with the rotor 20 on the radially outer side of the rotor 20. An air gap G is formed between the rotor 20 and the stator 10.

The stator 10 includes an annular stator core 11, and a stator coil 12 mounted to the stator core 11. The stator core 11 includes an annular core back 110, and a plurality of teeth 111 projecting from an inner peripheral surface of the core back 110 inward in the radial direction. The stator core is formed by, for example, stacking and integrating thin electromagnetic steel plates in the axial direction. Eighteen teeth 111 are arrayed at equiangular pitches in the circumferential direction, and a region between adjacent teeth 111 serves as a slot 112. The stator coil 12 is formed of concentrated-winding coils 120 each formed by winding a conductive wire around corresponding one of the teeth 111. Adjacent concentrated-winding coils 120 are accommodated in each of the slots 112.

The rotor 20 includes the rotary shaft 5, a cylindrical rotor core 21, and twenty-four permanent magnets 22. The rotor core 21 has a shaft insertion hole formed at an axial center position thereof. The permanent magnets 22 are embedded on the radially outer side of the rotor core 21. The rotor core 21 is firmly fixed to the rotary shaft 5 inserted through the shaft insertion hole. Both ends of the rotary shaft 5 in the axial direction are supported by the bearings 4 so that the rotor 20 is provided to be rotatable in the frame 2. The rotor core is formed by, for example, stacking and integrating thin electromagnetic steel plates in the axial direction.

Figure 3:
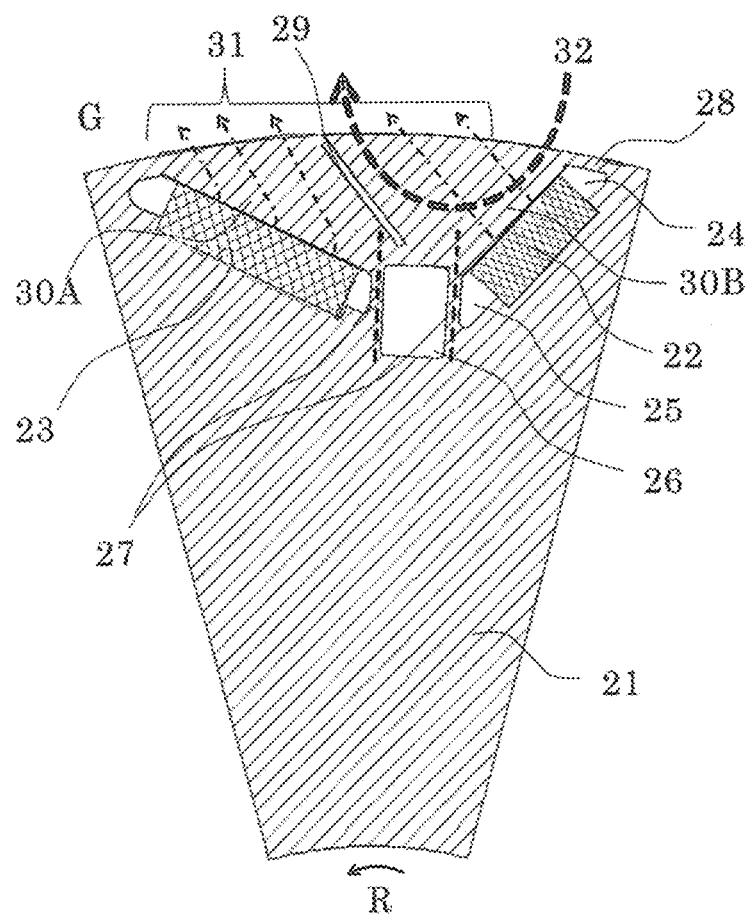
FIG. 3 is a main-part transverse sectional view for illustrating a part around one magnetic pole of a rotor in the rotating electric machine according to the first embodiment of the present invention.

Now, the structure around a magnetic pole of the rotor 20 is described with reference to FIG. 3. FIG. 3 is a main-part transverse sectional view for illustrating a part around one magnetic pole of the rotor in the rotating electric machine according to the first embodiment of the present invention. A transverse sectional view refers to a sectional view for illustrating a cross-section orthogonal to the axial center of the rotary shaft.

On the radially outer side of the rotor core 21, twelve pairs of magnet insertion holes 23 are formed at equiangular pitches in the circumferential direction. The magnet insertion holes 23 pass through the rotor core 21 in the axial direction. Each pair of magnet insertion holes 23 is formed in a V-shape so that an interval in the circumferential direction is gradually increased toward the radially outer side. The magnet insertion holes 23 are each formed into a hole shape having a rectangular cross-section. End portions on the radially inner side of the magnet insertion holes 23 forming a pair are separated away from each other in the circumferential direction.

The permanent magnets 22 are each formed as a prismatic body having a rectangular cross-section equivalent to that of the magnet insertion hole 23. The permanent magnets 22 are each magnetized so as to have magnetization orthogonal to a surface defined by a long side of the rectangular cross-section. In this manner, a first surface of the permanent magnet 22 defined by the long side of the rectangular cross-section thereof has an N pole, and a second surface thereof on the opposite side of the first surface has an S pole. The permanent magnets 22 are inserted and held in each pair of magnet insertion holes 23 so that surfaces having the same polarity are directed to the radially outer side, and are inserted and held in adjacent pairs of magnet insertion holes 23 so that surfaces having different polarities are directed to the radially outer side. That is, each pair of permanent magnets 22 arranged in a V-shape in which an interval in the circumferential direction is gradually increased toward the air gap G side forms one magnetic pole. Then, twelve pairs of permanent magnets 22 each forming one magnetic pole are embedded on the radially outer side of the rotor core 21 to be arrayed at equiangular pitches in the circumferential direction. In this manner, the rotor 20 has twelve magnetic poles.

A first flux barrier 24 is formed by projecting a surface on the radially outer side of each magnet insertion hole 23, which is defined by a short side of the rectangular cross-section thereof, in a length direction of the long side of the rectangular cross-section of the magnet insertion hole 23. A second flux barrier 25 serving as a magnet end flux barrier is formed by projecting a surface on the radially inner side of each magnet insertion hole 23, which is defined by a short side of the rectangular cross-section thereof, in the length direction of the long side of the rectangular cross-section of the magnet insertion hole 23. A third flux barrier 26 is formed at a position between the second flux barriers 25 of a pair of magnet insertion holes 23. Each of the first, second, and third flux barriers 24, 25, and 26 is formed to pass through the rotor core 21 in the axial direction.

In this case, parts of the second flux barrier 25 and the third flux barrier 26 adjacent to each other in the circumferential direction are positioned at the same radial distance from the axial center of the rotary shaft 5. At this position, a core region between the second flux barrier 25 and the third flux barrier 26 serves as a rib 27. Further, a core region between the first flux barrier 24 and an outer peripheral surface of the rotor core 21 serves as a bridge 28.

A first slit 29 is formed in a core region of the rotor core 21 positioned on the radially outer side of the pair of permanent magnets 22 arranged in the V-shape. The first slit 29 extends in a linear band shape from the vicinity of the third flux barrier 26 to reach the vicinity of the outer peripheral surface of the rotor core 21. The first slit 29 linearly extends while tilting to the front side in the rotating direction R. An end portion of the first slit 29 on the radially inner side, that is, an end portion thereof on the third flux barrier 26 side is positioned between extension lines of a pair of ribs 27. An end portion of the first slit 29 on the radially outer side, that is, an end portion thereof on the air gap G side is positioned in the vicinity of the outer peripheral surface of the rotor core 21. The first slit 29 may be formed to pass through the rotor core 21 in the axial direction, or may be formed so as not to pass through the rotor core 21 in the axial direction to have a halfway depth in the axial direction. Further, the first slit 29 has a minimum width portion that is narrower than a width of the rib 27 in the circumferential direction. In this manner, a stress around the rib 27 can be reduced.

The first slit 29 is hollow. Air has a magnetic permeability lower than that of the rotor core 21. Thus, the first slit 29 is a low magnetic permeability region in the core region on the radially outer side of the pair of permanent magnets 22 arranged in the V-shape. The first slit 29 may be filled with, for example, a resin or a heat dissipating material having a magnetic permeability lower than that of the rotor core 21. In this manner, the strength of the rotor core 21 can be increased. Further, an effect of cooling the rotor core 21 and the permanent magnets 22 can be increased.

In the rotating electric machine 1 configured as described above, the number of slots 112 of the stator 10 is eighteen, and the number of poles of the rotor 20 is twelve. That is, the rotating electric machine 1 is an inner rotor-type rotating electric machine employing a system in which a ratio of the number of poles to the number of slots is 2:3. The rotating electric machine 1 is assumed to be used for a power running operation. The power running operation refers to an operation for converting electric energy for energizing the stator coil 12 into kinetic energy for rotating the rotor 20. At this time, the rotating electric machine 1 operates as an electric motor. When the stator coil 12 is energized, a circumferential force acts on the rotor 20 in the same direction as the rotating direction R of the rotor 20. The power running operation is not a main idea of the present invention, and thus detailed description thereof is herein omitted.

The first flux barrier 24 is formed to project from the magnet insertion hole 23 toward the radially outer side in the length direction of the long side of the rectangular cross-section. The second flux barrier 25 is formed to project from the magnet insertion hole 23 toward the radially inner side in the length direction of the long side of the rectangular cross-section. The third flux barrier 26 is formed between the second flux barriers 25. Thus, the bridge 28 between the first flux barrier 24 and the outer peripheral surface of the rotor core 21 can have a narrowed radial width. Further, the rib 27 between the second flux barrier 25 and the third flux barrier 26 can have a narrowed circumferential width. This configuration allows suppression of a flow of a magnet magnetic flux 31 flowing through a closed magnetic path in the rotor core 21, which flows from the permanent magnet 22 via the rib 27 and the bridge 28 to return to the permanent magnet 22. As a result, an amount of the magnet magnetic flux 31 to be interlinked with the stator 10 via the air gap G is increased.

The first slit 29 linearly extends from the vicinity of the third flux barrier 26 to reach the vicinity of the outer peripheral surface of the rotor core 21. The first slit 29 tilts to the front side, that is, to the forward side in the rotating direction R. The end portion of the first slit 29 on the radially inner side is positioned in the vicinity of the third flux barrier 26. The end portion of the first slit 29 on the radially outer side is positioned in the vicinity of the outer peripheral surface of the rotor core 21. In this manner, the core region on the radially outer side of the pair of permanent magnets 22 forming one magnetic pole and being arranged in the V-shape is divided by the first slit 29 into a rotating-direction forward side core region 30A and a rotating-direction backward side core region 30B at the time of the power running operation.

Next, a state of the magnetic fluxes being sources of generation of the torque is described.

The magnet magnetic flux 31 generated from a magnetic flux generation surface of the permanent magnet 22 positioned on the forward side in the rotating direction R flows from the rotor core 21 to the air gap G. At this time, a direction in which the magnet magnetic flux 31 flows is restricted by the first slit 29 being the low magnetic permeability region, and the magnet magnetic flux 31 is caused to deviate to the forward side in the rotating direction. In this manner, the magnet magnetic flux 31 is localized in the rotating-direction forward side core region 30A as indicated by the arrows of FIG. 3. As a result, a current phase angle at which a magnet torque has a positive peak value can be set larger than a current phase angle of a case in which no first slit 29 is formed.

A path of a reluctance magnetic flux 32 flowing through the rotor core 21 from the stator core 11 via the air gap G is restricted by the first slit 29 being the low magnetic permeability region. In this manner, the reluctance magnetic flux 32 flows only through the rotating-direction backward side core region 30B without flowing through the rotating-direction forward side core region 30A as indicated by the arrow of FIG. 3. As a result, a current phase angle at which a reluctance torque has a positive peak value can be set smaller than the current phase angle obtained in the case in which no first slit 29 is formed.

Thus, a distance between the current phase angle at which the magnet torque has the positive peak value and the current phase angle at which the reluctance torque has the positive peak value is reduced. In this case, a combined torque of the magnet torque and the reluctance torque, that is, a comprehensive torque at the time of the power running operation can be improved.

Figure 4:
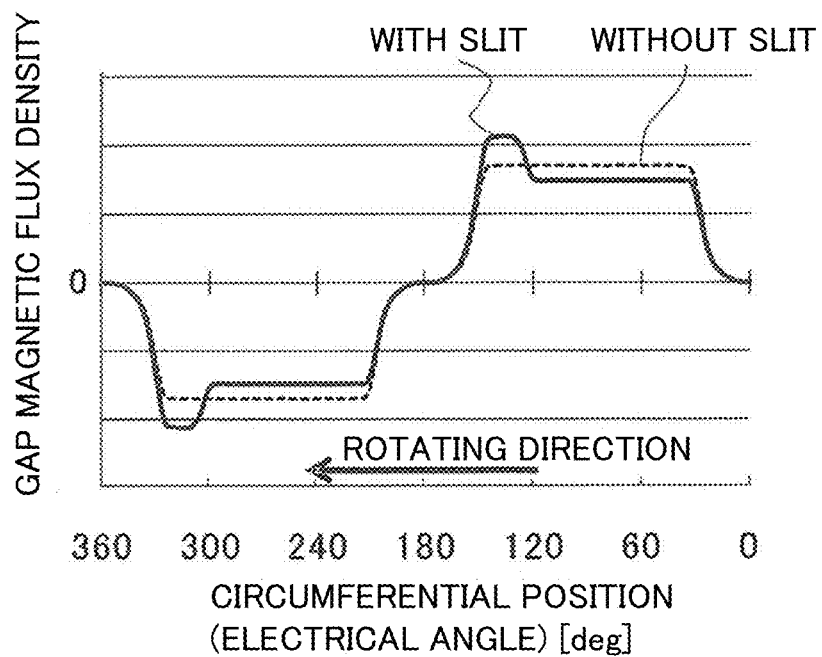
FIG. 4 is a graph for showing a gap magnetic flux density distribution caused by a magnet magnetic flux for one period of electrical angle in a non-energized state of the rotating electric machine according to the first embodiment of the present invention.

Next, results obtained by analyzing, by a finite element method, a gap magnetic flux density distribution caused by the magnet magnetic flux 31 for one period of electrical angle under a non-energized state are shown in FIG. 4. The one period of electrical angle corresponds to two magnetic poles. FIG. 4 is a graph for showing a gap magnetic flux density distribution caused by a magnet magnetic flux for one period of electrical angle in a non-energized state of the rotating electric machine according to the first embodiment of the present invention. In FIG. 4, the horizontal axis represents a circumferential position, and the vertical axis represents the gap magnetic flux density. Further, the dotted line indicates a gap magnetic flux density when no first slit 29 is formed, and the solid line indicates a gap magnetic flux density when the first slit 29 is formed.

It is understood from FIG. 4 that the gap magnetic flux density in one magnetic pole at the time of the power running operation deviates to the forward side in the rotating direction of the rotor 20 when the first slit 29 is formed as compared to when no first slit 29 is formed.

Figure 5:
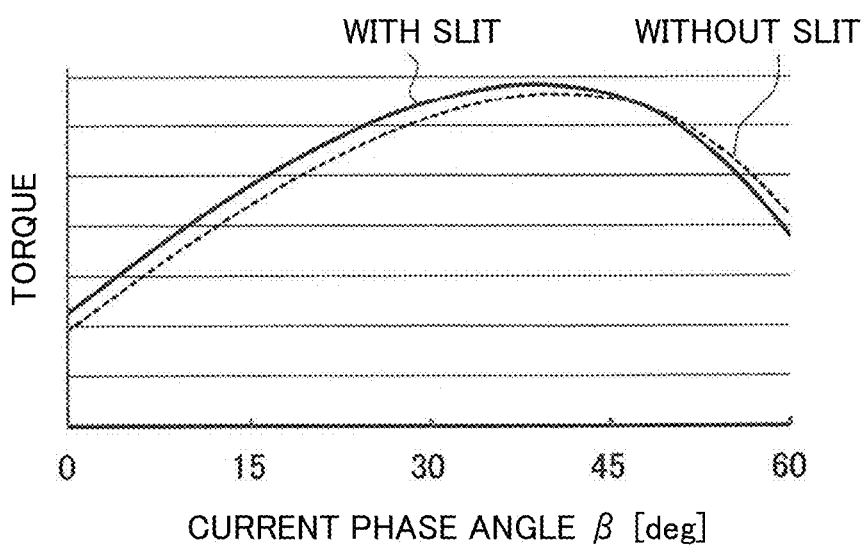
FIG. 5 is a graph for showing a change in torque with respect to a current phase angle under a condition of a constant current value, in the rotating electric machine according to the first embodiment of the present invention.

Next, results obtained by analyzing, by a finite element method, a change in torque with respect to a current phase angle $\beta$ under a condition of a constant current value are shown in FIG. 5. FIG. 5 is a graph for showing a change in torque with respect to a current phase angle under a condition of a constant current value, in the rotating electric machine according to the first embodiment of the present invention. In FIG. 5, the horizontal axis represents the current phase angle $\beta$, and the vertical axis represents torque. Further, the dotted line indicates the torque when no first slit 29 is formed, and the solid line indicates the torque when the first slit 29 is formed. The torque is the combined torque of the magnet torque and the reluctance torque.

It is understood from FIG. 5 that the current phase angle $\beta$ at which the combined toque has the positive peak value when the first slit 29 is formed is smaller than the current phase angle $\beta$ at which the combined toque has the positive peak value when no first slit 29 is formed. Further, it is understood from FIG. 5 that the positive peak value of the combined torque when the first slit 29 is formed is larger than the positive peak value of the combined torque when no first slit 29 is formed.

When no first slit 29 is formed, the magnet torque has the positive peak value when the current phase angle $\beta$ is 0°, and the reluctance torque has the positive peak value when the current phase angle $\beta$ is 45°. From the results of FIG. 5, it is speculated that, when the first slit 29 is formed, the current phase angle $\beta$ at which the magnet torque has the positive peak value and the current phase angle $\beta$ at which the reluctance torque has the positive peak value are brought close to each other to improve the combined torque.

As described above, in the first embodiment, the first slit 29 being the low magnetic permeability region is formed in the core region on the radially outer side of the permanent magnets 22 forming one magnetic pole and being arranged in the V-shape so as to tilt to the forward side in the rotating direction R. In this manner, the current phase angle $\beta$ at which the magnet torque has the positive peak value and the current phase angle $\beta$ at which the reluctance torque has the positive peak value are brought close to each other. As a result, at the time of the power running operation, the combined torque of the magnet torque and the reluctance torque is improved.

Now, a stress generated in the rotor core at the time of the power running operation is described.

Figure 6:
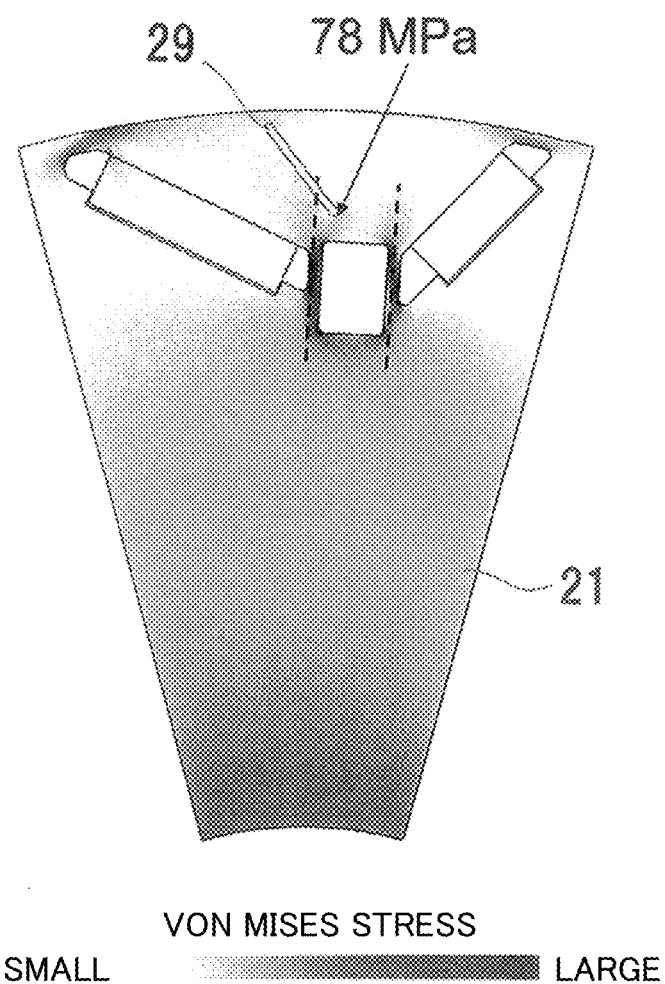
FIG. 6 is a von Mises stress distribution diagram of a stress analysis result in the rotor in the rotating electric machine according to the first embodiment of the present invention.

FIG. 6 is a von Mises stress distribution diagram of a stress analysis result in the rotor in the rotating electric machine according to the first embodiment of the present invention, and FIG. 7 is a von Mises stress distribution diagram of a stress analysis result in a rotor in Comparative Example.

In the rotor core 21 of the rotor 20, as illustrated in FIG. 3, the third flux barrier 26 is formed between one set of permanent magnets 22 adjacent to each other in the circumferential direction in a group of permanent magnets 22 forming one magnetic pole. The pair of ribs 27 is formed of regions of the rotor core 21 between the third flux barrier 26 and the one set of permanent magnets 22 adjacent to each other. The end portion of the first slit 29 on the radially inner side is separated away from the third flux barrier 26, and is positioned within the circumferential region between the extension lines of the pair of ribs 27.

In a rotor core 201 of a rotor 200 in Comparative Example, as illustrated in FIG. 7, the end portion of the first slit 29 on the radially inner side is separated away from the third flux barrier 26, and is positioned on the backward side in the rotating direction of the extension lines of the pair of ribs 27. Other configurations of the rotor core 201 are similar to those of the rotor core 21.

The stress generated in the rotor core 201 in Comparative Example at the time of the power running operation was, as illustrated in FIG. 7, 156 MPa. The stress generated in the rotor core 21 at the time of the power running operation was, as illustrated in FIG. 6, 78 MPa. As described above, it has been confirmed that, when the end portion of the first slit 29 on the radially inner side is positioned within the circumferential region between the extension lines of the pair of ribs 27, the stress generated in the rotor core 21 can be reduced.

In the rotor 200 in Comparative Example, when the centrifugal force acts on the permanent magnet 22, the end portion of the first slit 29 on the radially inner side is positioned in a direction in which the rotor core 201 is displaced. Further, the minimum width portion of the first slit 29 is smaller than the width of the rib 27 in the circumferential direction. Therefore, the stress generated at the end portion of the first slit 29 on the radially inner side is increased. In the rotor 20, the end portion of the first slit 29 on the radially inner side is positioned in a region sandwiched between the extension lines of the pair of ribs 27. Therefore, when the centrifugal force acts on the permanent magnet 22, the end portion of the first slit 29 on the radially inner side is distant away from the direction in which the rotor core 21 is displaced. It is speculated that the stress generated at the end portion of the first slit 29 on the radially inner side is reduced in this manner.

As described above, in the rotor 20 in the first embodiment, the end portion of the first slit 29 on the radially inner side is positioned in a region sandwiched between the extension lines of the pair of ribs 27. In this manner, the stress generated in the rotor core 21 is reduced. Further, in the rotor 20, the first slit 29 is formed in the core region on the radially outer side of the permanent magnets 22 forming one magnetic pole and being arranged in the V-shape so as to tilt to the forward side in the rotating direction R. In this manner, at the time of the power running operation, the combined torque of the magnet torque and the reluctance torque is improved.

Figure 8:
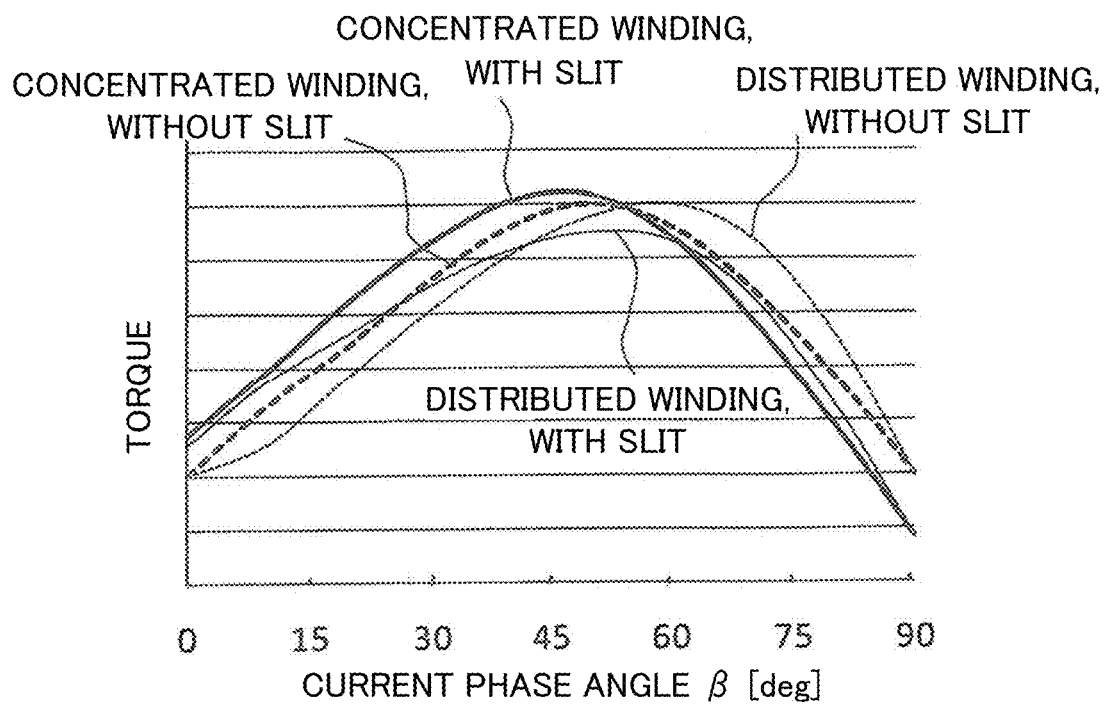
FIG. 8 is a graph for showing a change in torque with respect to a current phase angle under a condition of a constant current value, in the rotating electric machine according to the first embodiment of the present invention.

Next, results obtained by analyzing, by a finite element method, a change in torque with respect to the current phase angle β under a condition of a constant current value, in a configuration in which the permanent magnets 22 are removed from the rotor 20 and the stator coil 12 is formed of concentrated-winding coils or distributed-winding coils, are shown in FIG. 8. FIG. 8 is a graph for showing a change in torque with respect to a current phase angle under a condition of a constant current value, in the rotating electric machine according to the first embodiment of the present invention. In FIG. 8, the horizontal axis represents the current phase angle β, and the vertical axis represents torque. Further, the dotted line indicates the torque when no first slit 29 is formed, and the solid line indicates the torque when the first slit 29 is formed. The torque is the reluctance torque.

As shown in FIG. 8, when the stator coil having the concentrated-winding structure is used, in a case in which the first slit 29 is formed, as compared to a case in which no first slit 29 is formed, the positive peak value of the reluctance torque is increased. Meanwhile, when the stator coil having the distributed-winding structure is used, in the case in which the first slit 29 is formed, as compared to the case in which no first slit 29 is formed, the positive peak value of the reluctance torque is decreased. As described above, it has been confirmed that, even in the concentrated-winding structure in which exertion of the reluctance torque has been insufficient in the related art, when the first slit 29 is formed, the path of the reluctance magnetic flux is changed, and thus the reluctance torque can be improved.

Further, as shown in FIG. 8, regardless of the winding structure of the stator coil, when the first slit 29 is formed, the current phase angle β at which the reluctance torque has the positive peak value is decreased. Therefore, regardless of the winding structure of the stator coil, when the first slit 29 is formed, the current phase angle β at which the magnet torque has the positive peak value and the current phase angle β at which the reluctance torque has the positive peak value are brought close to each other. As a result, at the time of the power running operation, the combined torque of the magnet torque and the reluctance torque is improved.

Figure 9:
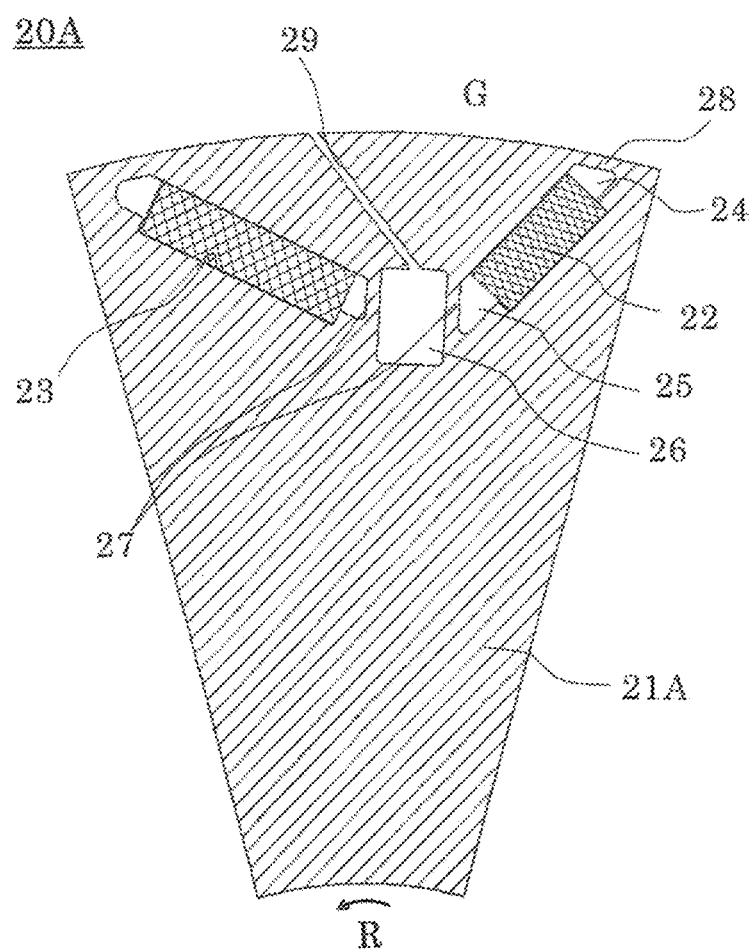
FIG. 9 is a main-part transverse sectional view for illustrating a part around one magnetic pole of a rotor in a first modification example in the rotating electric machine according to the first embodiment of the present invention.
Figure 10:
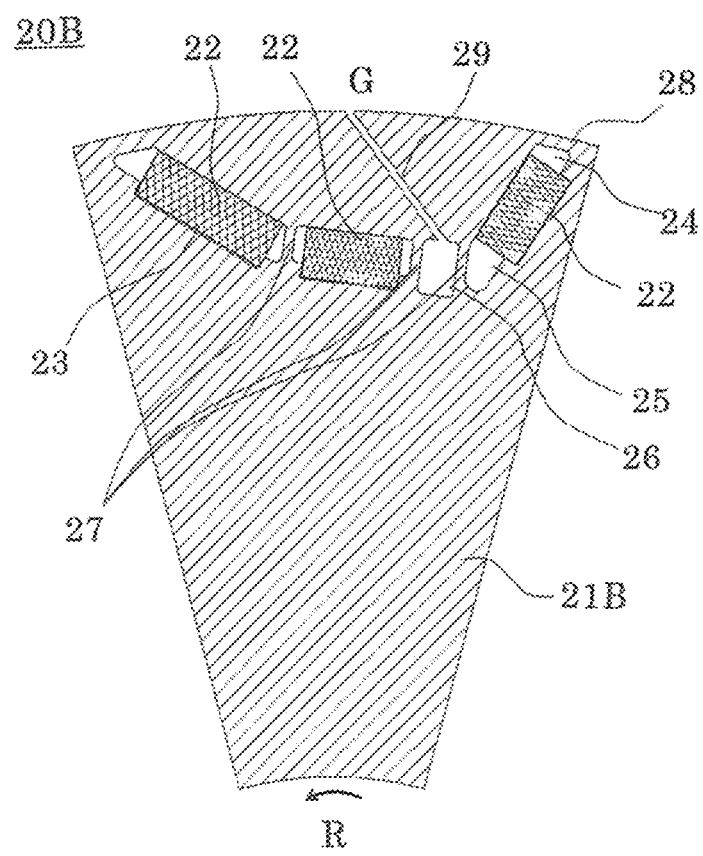
FIG. 10 is a main-part transverse sectional view for illustrating a part around one magnetic pole of a rotor in a second modification example in the rotating electric machine according to the first embodiment of the present invention.
Figure 11:
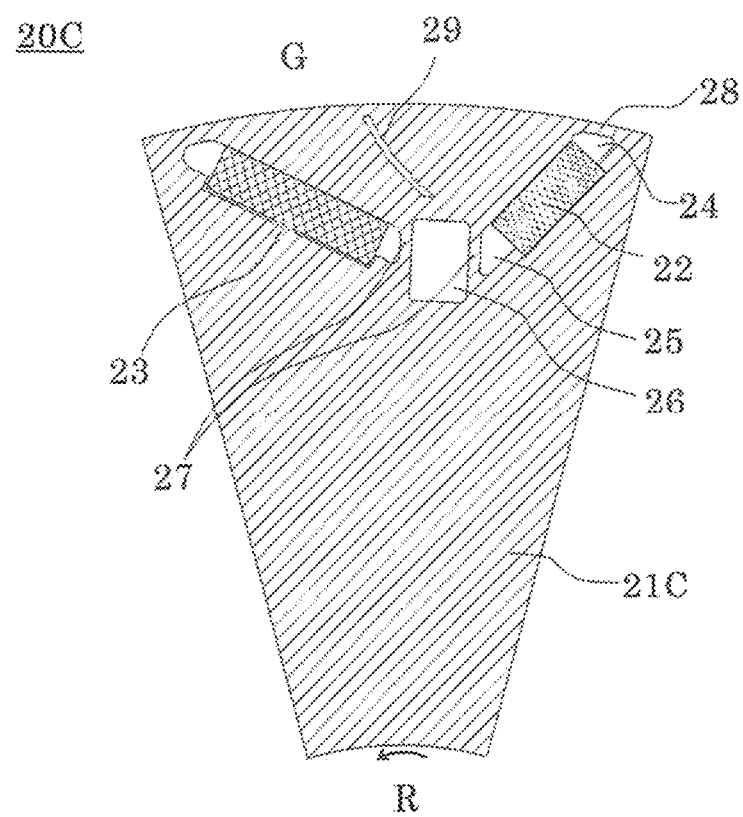
FIG. 11 is a main-part transverse sectional view for illustrating a part around one magnetic pole of a rotor in a third modification example in the rotating electric machine according to the first embodiment of the present invention.
Figure 12:
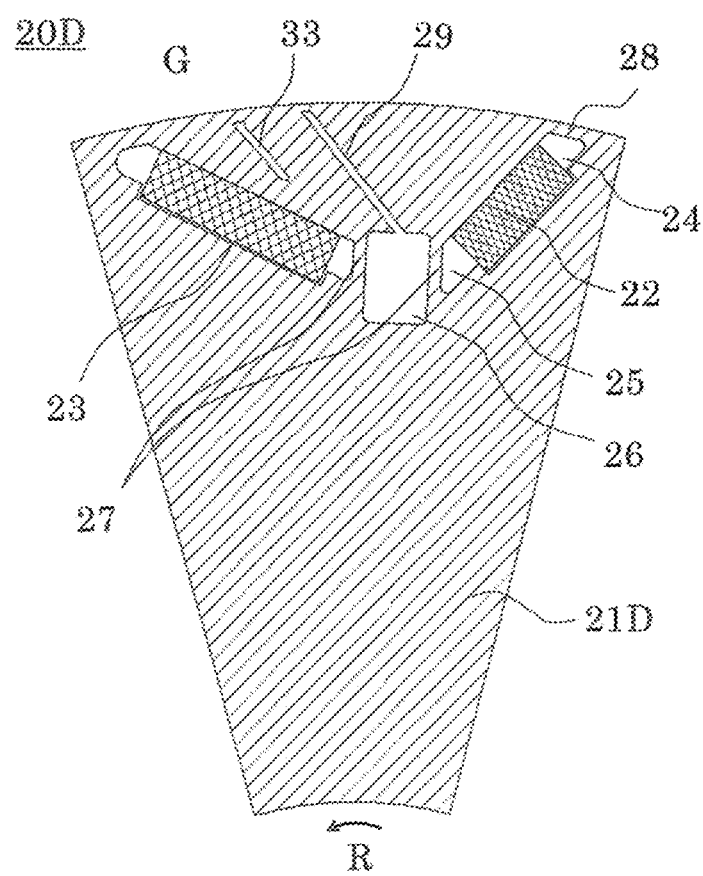
FIG. 12 is a main-part transverse sectional view for illustrating a part around one magnetic pole of a rotor in a fourth modification example in the rotating electric machine according to the first embodiment of the present invention.
Figure 13:
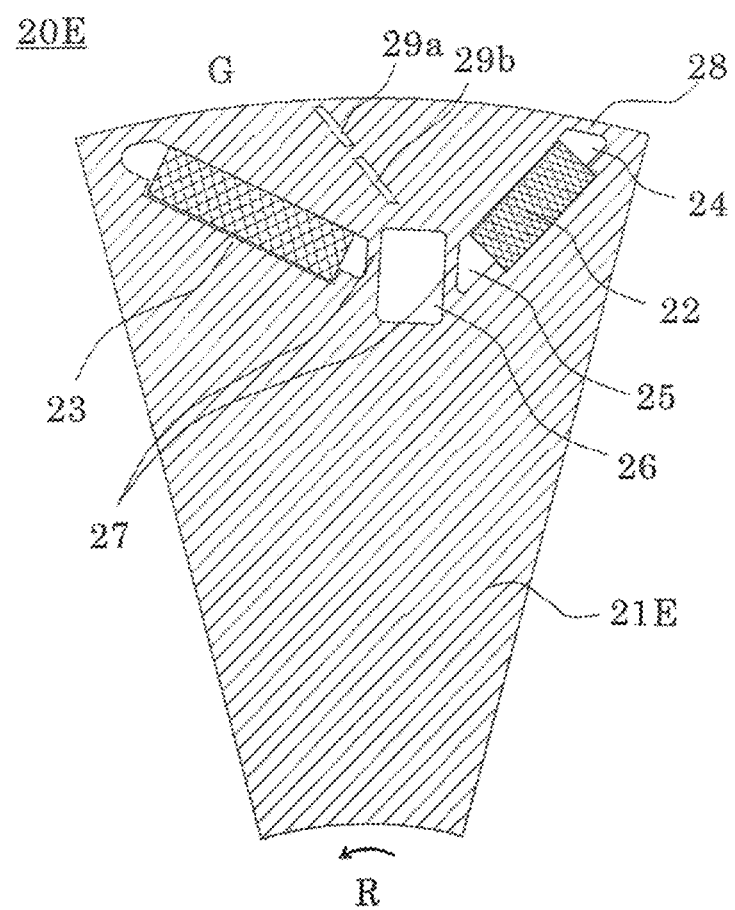
FIG. 13 is a main-part transverse sectional view for illustrating a part around one magnetic pole of a rotor in a fifth modification example in the rotating electric machine according to the first embodiment of the present invention.

Next, modification examples of the rotor are described. FIG. 9 is a main-part transverse sectional view for illustrating a part around one magnetic pole of a rotor in a first modification example in the rotating electric machine according to the first embodiment of the present invention. FIG. 10 is a main-part transverse sectional view for illustrating a part around one magnetic pole of a rotor in a second modification example in the rotating electric machine according to the first embodiment of the present invention. FIG. 11 is a main-part transverse sectional view for illustrating a part around one magnetic pole of a rotor in a third modification example in the rotating electric machine according to the first embodiment of the present invention. FIG. 12 is a main-part transverse sectional view for illustrating a part around one magnetic pole of a rotor in a fourth modification example in the rotating electric machine according to the first embodiment of the present invention. FIG. 13 is a main-part transverse sectional view for illustrating a part around one magnetic pole of a rotor in a fifth modification example in the rotating electric machine according to the first embodiment of the present invention.

In a rotor 20A in the first modification example, as illustrated in FIG. 9, the first slit 29 is formed in a rotor core 21A so as to be opened to the third flux barrier 26 and the air gap G. The end portion of the first slit 29 on the radially inner side is positioned within the circumferential region between the extension lines of the pair of ribs 27. Other configurations of the rotor 20A are similar to those of the rotor 20. Thus, even when the rotor 20A is used, effects similar to those in the first embodiment can be obtained. Further, when the rotor 20A is used, a leakage magnetic flux on the air gap G side of the first slit 29 is reduced, and hence the torque can be more improved.

In a rotor 20B in the second modification example, as illustrated in FIG. 10, three magnet insertion holes 23 holding the permanent magnets 22 forming one magnetic pole are formed in a V-shape in which an interval in the circumferential direction is gradually increased toward the radially outer side. That is, two magnet insertion holes 23 are arrayed in one row while tilting to the forward side in the rotating direction. The remaining one magnet insertion hole 23 tilts to the backward side in the rotating direction. The first flux barrier 24 and the second flux barrier 25 are formed at both ends of each magnet insertion hole 23 in the length direction of the long side of the rectangular cross-section thereof. The rib 27 is formed between the magnet insertion holes 23 tilting to the forward side in the rotating direction. The third flux barrier 26 is formed between the magnet insertion holes 23 having different tilting directions. A pair of ribs 27 is formed across the third flux barrier 26. The first slit 29 is formed in a rotor core 21B so as to be opened to the third flux barrier 26 and the air gap G.

Therefore, even when the rotor 20B is used, effects similar to those in the case in which the above-mentioned rotor 20A is used can be obtained. The number of permanent magnets 22 forming one magnetic pole may be four or more. Also in this case, the permanent magnets 22 are arranged in a V-shape. The third flux barrier 26 is formed between the permanent magnets 22 forming a valley portion of the V-shape.

In a rotor 20C in the third modification example, as illustrated in FIG. 11, the first slit 29 is formed in a rotor core 21C from the vicinity of the third flux barrier 26 to reach the vicinity of the outer peripheral surface of the rotor core 21D. The first slit 29 is formed into an arc band shape convex to the forward side in the rotating direction R. Other configurations of the rotor 20C are similar to those of the rotor 20. Thus, even when the rotor 20C is used, effects similar to those in the first embodiment can be obtained.

In a rotor 20D in the fourth modification example, as illustrated in FIG. 12, a second slit 33 having a linear band shape is formed in a rotor core 21D on the forward side in the rotating direction of the first slit 29, from the vicinity of the magnet insertion hole 23 to reach the vicinity of the outer peripheral surface of the rotor core 21D. Other configurations of the rotor 20D are similar to those of the rotor 20. Thus, even when the rotor 20D is used, effects similar to those in the first embodiment can be obtained. Further, the second slit 33 is formed on the radially outer side of the permanent magnet 22 positioned on the forward side in the rotating direction R of the two permanent magnets 22 forming one magnetic pole. Therefore, an end portion of the second slit 33 on the radially inner side is distant away from the direction in which the rotor core 21D is displaced when the centrifugal force acts on the permanent magnet 22 positioned on the forward side in the rotating direction R. Thus, a stress generated at the end portion of the second slit 33 on the radially inner side is not increased. Further, the second slit 33 being a low magnetic permeability region is formed in the rotating-direction forward side core region 30A so as to tilt to the forward side in the rotating direction. Thus, the direction in which the magnet magnetic flux 31 flows is restricted by the second slit 33 being the low magnetic permeability region, and the magnet magnetic flux 31 is further caused to deviate to the forward side in the rotating direction.

In a rotor 20E in the fifth modification example, as illustrated in FIG. 13, two first slits 29a and 29b each having a linear band shape are formed in a rotor core 21E side by side in one row from the vicinity of the third flux barrier 26 to reach the vicinity of the outer peripheral surface of the rotor core 21F. Other configurations of the rotor 20E are similar to those of the rotor 20. Thus, even when the rotor 20E is used, effects similar to those in the first embodiment can be obtained. In the fifth modification example, the first slit is divided into two slits, but the first slit may be divided into three or more slits. Further, in the rotor 20C in the third modification example, the first slit 29 having the arc band shape may be divided into a plurality of first slits.

As described above in the first embodiment and the first to fifth modification examples, as long as the end portion of the first slit 29 on the radially inner side is positioned between the extension lines of the pair of ribs 27, the shape and arrangement of the first slit 29 and the number of permanent magnets 22 can be changed as appropriate. In this manner, a high torque can be effectively obtained without causing magnetic saturation by the magnet magnetic flux 31.

Further, as long as the end portion of the first slit 29 on the radially inner side is positioned between the extension lines of the pair of ribs 27, one or more second slits 33 may be formed in a core region on the forward side in the rotating direction of the first slit 29.

Second Embodiment

Figure 14:
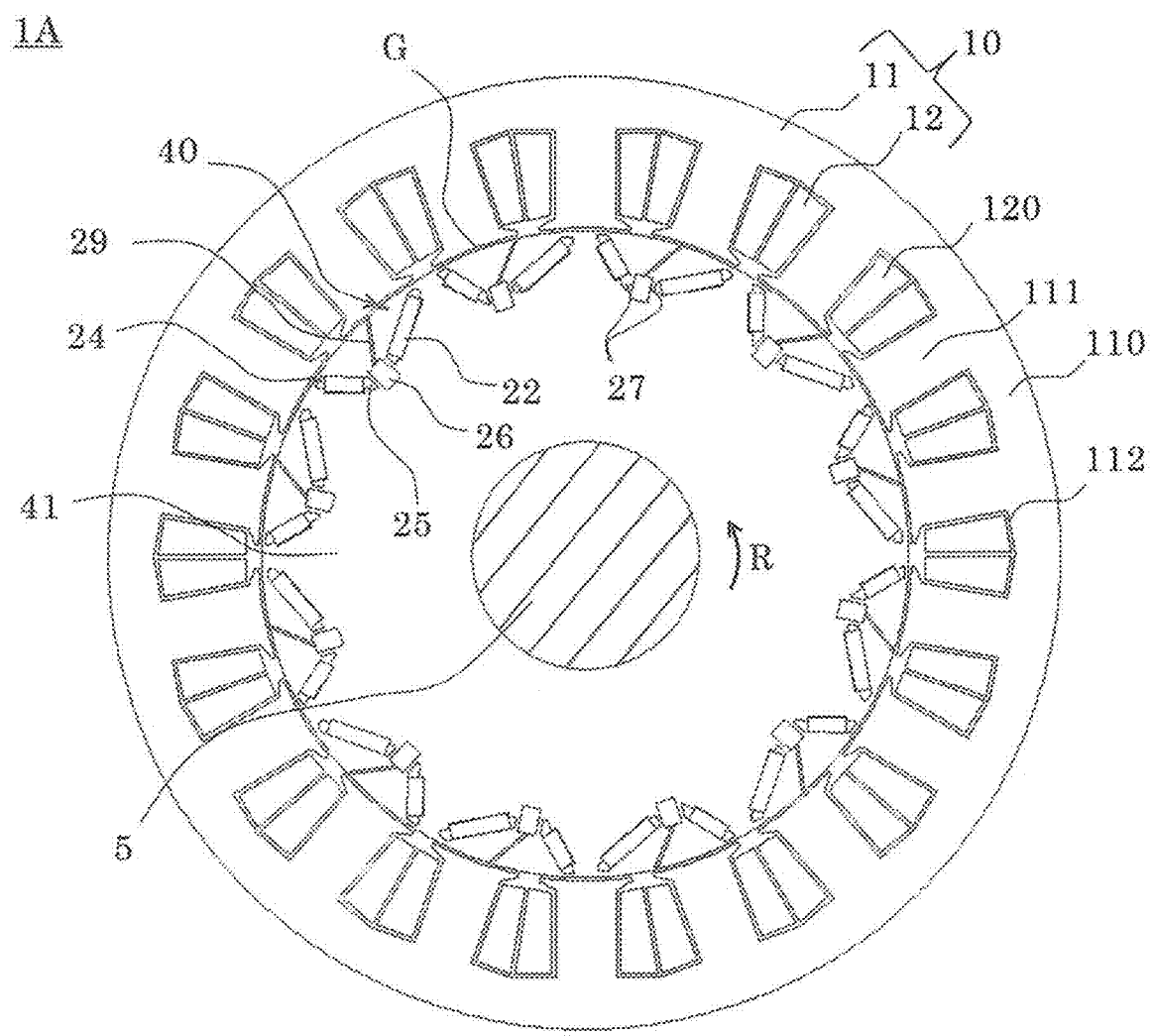
FIG. 14 is a transverse sectional view for illustrating a rotating electric machine according to a second embodiment of the present invention.
Figure 15:
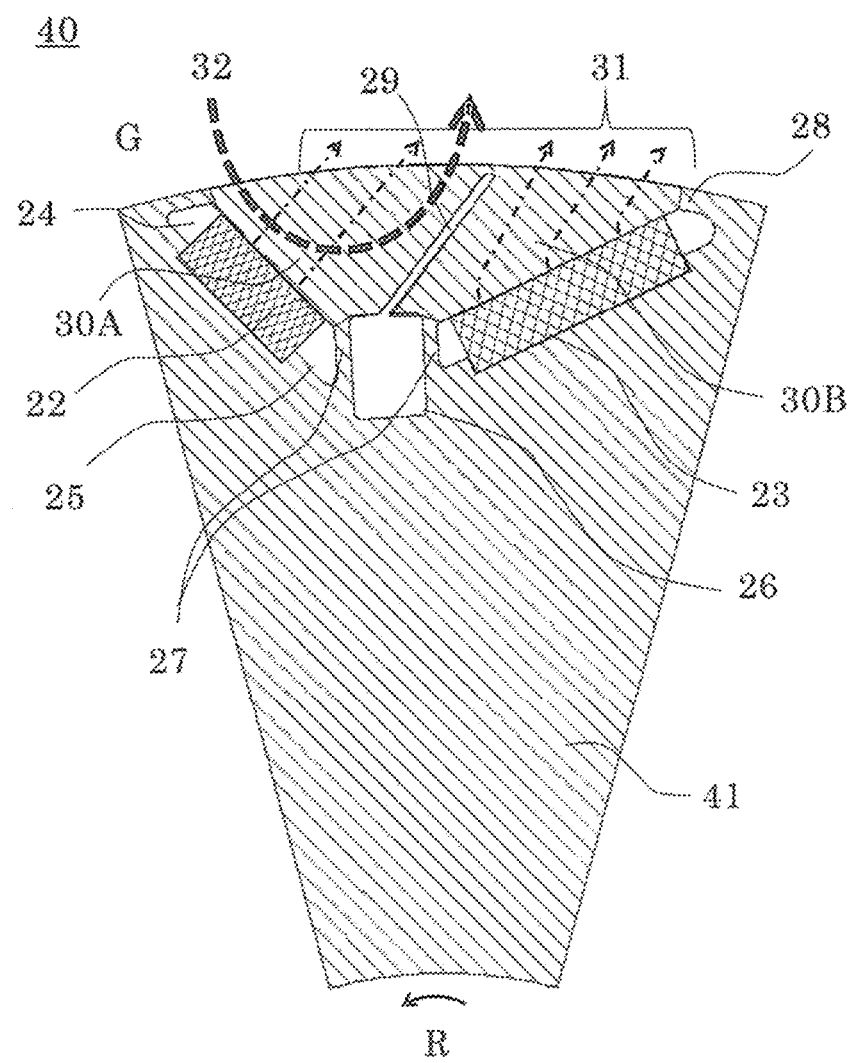
FIG. 15 is a main-part transverse sectional view for illustrating a part around one magnetic pole of a rotor in the rotating electric machine according to the second embodiment of the present invention.

FIG. 14 is a transverse sectional view for illustrating a rotating electric machine according to a second embodiment of the present invention. FIG. 15 is a main-part transverse sectional view for illustrating a part around one magnetic pole of a rotor in the rotating electric machine according to the second embodiment of the present invention.

The rotating electric machine 1 according to the above-mentioned first embodiment is assumed to be used for the power running operation, but a rotating electric machine 1A according to the second embodiment is assumed to be used for a regeneration operation. The regeneration operation refers to an operation for converting kinetic energy given to a rotor 40 into electrical energy to extract the electrical energy from a terminal of the stator coil 12. At this time, the rotating electric machine 1A acts as a power generator. The regeneration operation is not a main idea of the present invention, and thus detailed description thereof is herein omitted.

In FIG. 14 and FIG. 15, the rotating electric machine 1A includes the stator 10 and the rotor 40. The rotor 40 is arranged on the radially inner side of the stator 10 and coaxially with the stator 10 with a gap G formed between the stator 10 and the rotor 40. The rotor 40 includes a rotor core 41. Although not shown, the stator 10 and the rotor 40 are accommodated in a housing formed of the frame 2 and the pair of end plates 3.

The rotor core 41 is configured similarly to the rotor core 21 except that the arrangement of the first slit 29 is different. Specifically, the first slit 29 extends in a linear band shape in a core region on the radially outer side of a pair of permanent magnets 22 arranged in a V-shape, from the third flux barrier 26 to reach the vicinity of the outer peripheral surface of the rotor core 41. The first slit 29 tilts to the rear side, that is, the backward side in the rotating direction R. An end portion of the first slit 29 on the radially inner side is coupled to the third flux barrier 26, and is positioned between the extension lines of the pair of ribs 27. An end portion of the first slit 29 on the radially outer side is positioned in the vicinity of the outer peripheral surface of the rotor core 41.

The core region on the radially outer side of the pair of permanent magnets 22 forming one magnetic pole and being arranged in the V-shape is divided by the first slit 29 into the rotating-direction forward side core region 30A and the rotating-direction backward side core region 30B at the time of the regeneration operation.

The rotor 40 rotates by receiving kinetic energy from the outside. At the time of the regeneration operation, the direction of the circumferential force acting on the rotor 40 when the stator coil 12 is energized is reverse to the rotating direction R of the rotor 40. That is, at the time of the regeneration operation, the torque that the rotating electric machine 1A itself exerts acts so as to cancel out the torque from the outside.

Next, a state of the magnetic fluxes being sources of generation of the torque is described. At the time of the regeneration operation, the magnet magnetic flux 31 generated from the permanent magnet 22 positioned on the backward side in the rotating direction is likely to flow from the rotor core 41 to the gap G. At this time, a direction in which the magnet magnetic flux 31 flows is restricted by the first slit 29 being the low magnetic permeability region, and the magnet magnetic flux 31 is caused to deviate to the backward side in the rotating direction. In this manner, the magnet magnetic flux 31 is localized in the rotating-direction backward side core region 30B as indicated by the arrows of FIG. 15. As a result, a current phase angle β at which a magnet torque has a negative peak value can be set smaller than a current phase angle β of a case in which no first slit 29 is formed. As a result, a current phase angle β at which a reluctance torque has a negative peak value can be set larger than the current phase angle obtained in the case in which no first slit 29 is formed.

Further, a path of the reluctance magnetic flux 32, which is likely to flow from the stator core 11 to the rotor core 41 via the gap G, is restricted by the first slit 29 being the low magnetic permeability region. In this manner, the reluctance magnetic flux 32 passes through the rotating-direction forward side core region 30A without passing through the rotating-direction backward side core region 30B as indicated by the arrow of FIG. 15. In this manner, the current phase angle β at which the reluctance torque has the negative peak value can be set larger than the current phase angle β obtained in the case in which no first slit 29 is formed.

In the second embodiment, the first slit 29 is formed so that the current phase angle at which the magnet torque has the negative peak value and the current phase angle at which the reluctance torque has the negative peak value can be brought close to each other. Therefore, the combined torque of the magnet torque and the reluctance torque of the rotating electric machine 1A at the time of the regeneration operation can be improved.

Further, the end portion of the first slit 29 on the radially inner side is positioned in the circumferential region between the extension lines of the pair of ribs 27, and hence a stress generated at the end portion of the first slit 29 on the radially inner side can be decreased.

Also in the second embodiment, similarly to the above-mentioned first embodiment, as long as the end portion of the first slit 29 on the radially inner side is positioned between the extension lines of the pair of ribs 27, the shape and arrangement of the first slit 29 and the number of permanent magnets 22 can be changed as appropriate.

Third Embodiment

Figure 16:
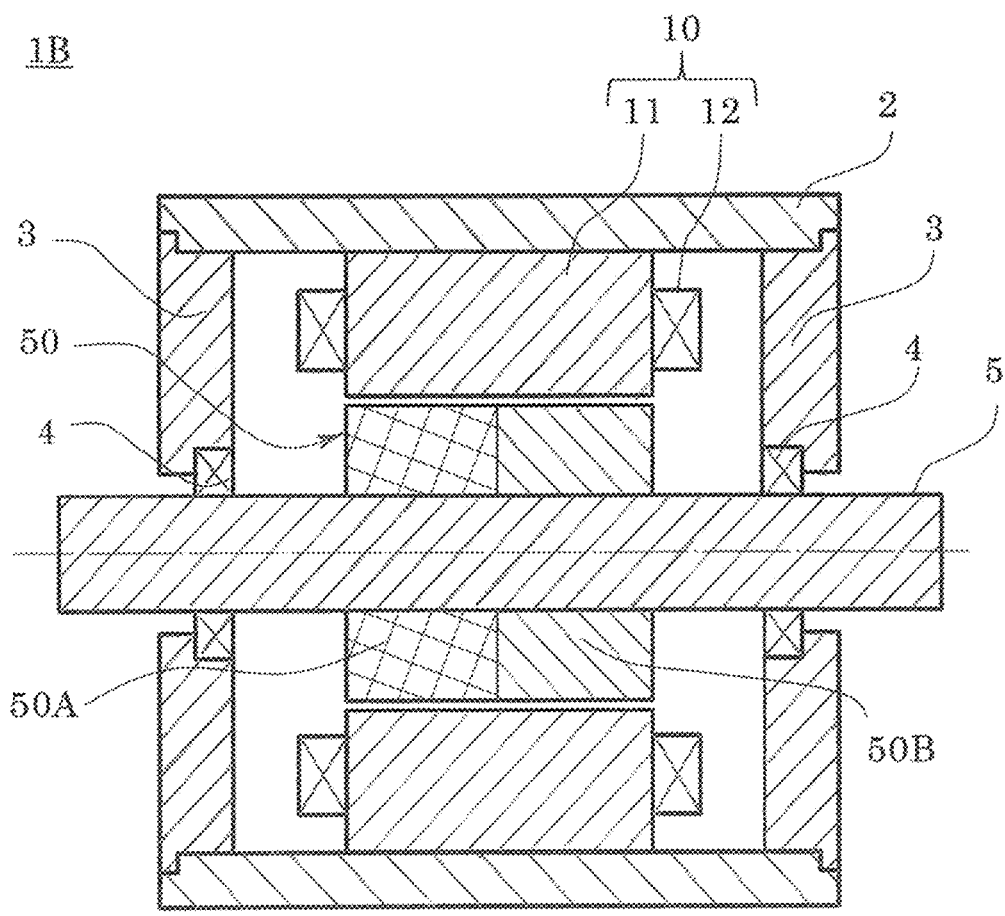
FIG. 16 is a longitudinal sectional view for illustrating a rotating electric machine according to a third embodiment of the present invention.
Figure 17:
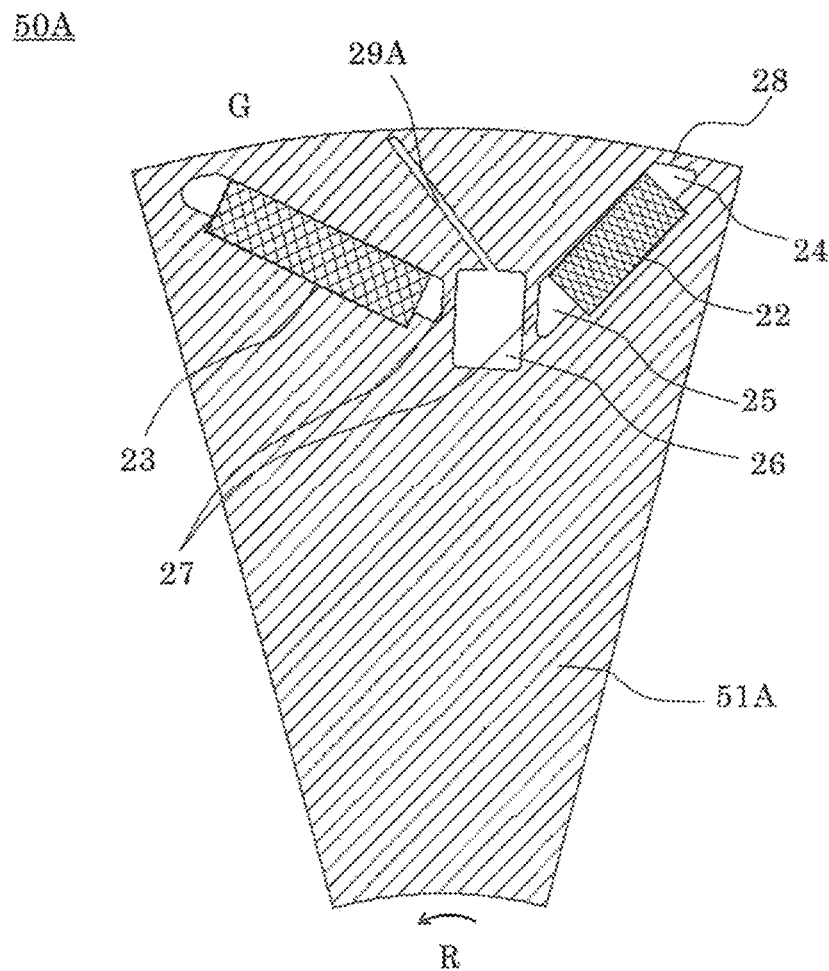
FIG. 17 is a main-part transverse sectional view for illustrating a part around one magnetic pole of a first rotor in the rotating electric machine according to the third embodiment of the present invention.
Figure 18:
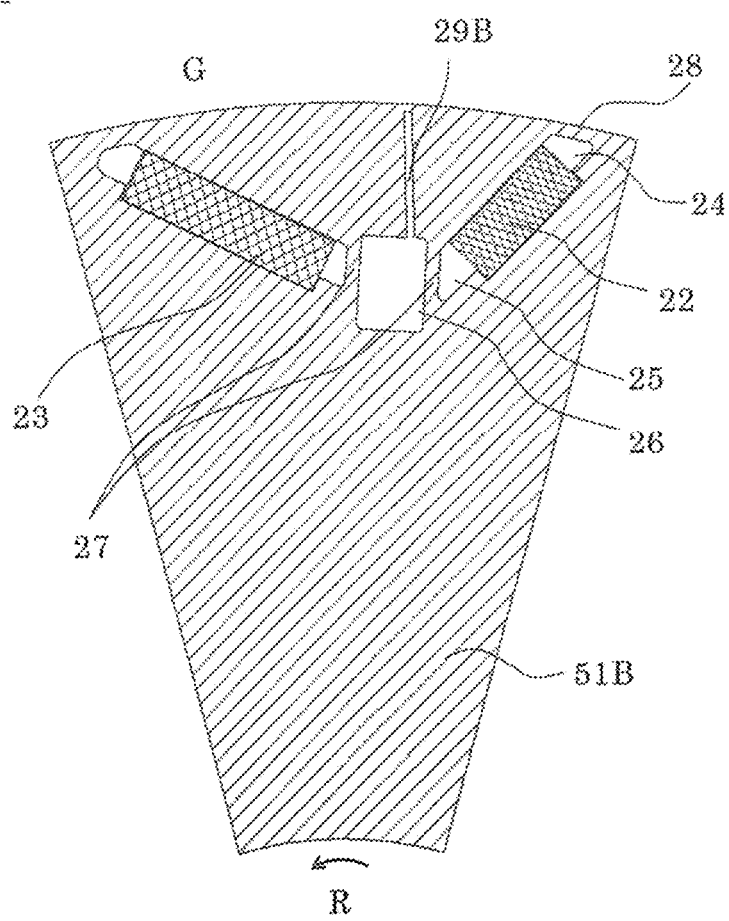
FIG. 18 is a main-part transverse sectional view for illustrating a part around one magnetic pole of a second rotor in the rotating electric machine according to the third embodiment of the present invention.

FIG. 16 is a longitudinal sectional view for illustrating a rotating electric machine according to a third embodiment of the present invention. FIG. 17 is a main-part transverse sectional view for illustrating a part around one magnetic pole of a first rotor in the rotating electric machine according to the third embodiment of the present invention. FIG. 18 is a main-part transverse sectional view for illustrating a part around one magnetic pole of a second rotor in the rotating electric machine according to the third embodiment of the present invention.

In FIG. 16, a rotating electric machine 1B includes the frame 2, the pair of end plates 3, the rotary shaft 5, the stator 10, and a rotor 50. The pair of end plates 3 is configured to close openings on both sides of the frame 2 in the axial direction. The rotary shaft 5 is supported by the bearings 4 mounted to the pair of end plates 3 so as to be rotatable in the frame 2. The stator 10 is accommodated and held in the frame 2. The rotor 50 is arranged on the radially inner side of the stator 10 and coaxially with the stator 10 with a gap G formed between the rotor 50 and the stator 10. The rotor 50 includes a first rotor 50A and a second rotor 50B that are obtained by dividing the rotor 50 into two equal parts in the axial direction. The first rotor 50A and the second rotor 50B include a first divided rotor core 51A and a second divided rotor core 51B, respectively.

The first divided rotor core 51A and the second divided rotor core 51B are configured similarly to each other except that the shapes and arrangements of a first slit 29A and a first slit 29B are different. The first divided rotor core 51A and the second divided rotor core 51B are configured similarly to the rotor core 21 in the first embodiment except that the shape, arrangement, and axial length of the first slit are different.

As illustrated in FIG. 17, the first slit 29A extends in a linear shape in a core region on the radially outer side of the pair of permanent magnets 22 arranged in a V-shape, from the third flux barrier 26 to reach the vicinity of the outer peripheral surface of the first divided rotor core 51A. The first slit 29A tilts to the front side, that is, the forward side in the rotating direction R. An end portion of the first slit 29A on the radially inner side is coupled to the third flux barrier 26, and is positioned between the extension lines of the pair of ribs 27. An end portion of the first slit 29A on the radially outer side is positioned in the vicinity of the outer peripheral surface of the first divided rotor core 51A.

As illustrated in FIG. 18, the first slit 29B extends in a linear shape in a core region on the radially outer side of a pair of permanent magnets 22 arranged in a V-shape, from the third flux barrier 26 to reach the vicinity of the outer peripheral surface of the second divided rotor core 51B. The first slit 29B is formed on the rear side, that is, the backward side in the rotating direction of the first slit 29A. The first slit 29B tilts to the forward side in the rotating direction R. The end portion of the first slit 29B on the radially inner side is coupled to the third flux barrier 26, and is positioned between the extension lines of the pair of ribs 27. An end portion of the second slit 29B on the radially outer side is positioned in the vicinity of the outer peripheral surface of the second divided rotor core 51B.

In the third embodiment, each of the first slit 29A and the first slit 29B is formed in the core region on the radially outer side of the permanent magnets 22 forming one magnetic pole and being arranged in the V-shape so as to tilt to the forward side in the rotating direction R. Thus, also in the third embodiment, at the time of the power running operation, the combined torque of the magnet torque and the reluctance torque is improved. Further, the end portion of each of the first slit 29A and the first slit 29B on the radially inner side is positioned in the region sandwiched between the extension lines of the pair of ribs 27. Thus, also in the third embodiment, the stress generated in each of the first divided rotor core 51A and the second divided rotor core 51B is reduced.

When the shape or the arrangement of the first slit is changed, phases and amplitudes of a cogging torque, a torque ripple, and harmonic components of an electromagnetic excitation force change. In the third embodiment, the first slit 29A and the first slit 29B have different shapes and different arrangements. Thus, when the first slit 29A and the first slit 29B having different shapes and different arrangements are combined as appropriate, the cogging torque, the torque ripple, and the harmonic components of the electromagnetic excitation force can be canceled out. In this manner, the cogging torque, the torque ripple, and the harmonic components of the electromagnetic excitation force can be reduced.

In the above-mentioned third embodiment, the rotor core is divided into two equal parts in the axial direction, but the rotor core may be divided into two unequal parts.

Further, in the above-mentioned third embodiment, the rotor core is divided into two parts in the axial direction, but the rotor core may be divided into three or more parts. In this case, as long as, in each divided rotor core, similarly to the above-mentioned first embodiment, the end portion of the first slit on the radially inner side is positioned between the extension lines of the pair of ribs, the shape and arrangement of the first slit and the number of permanent magnets can be changed as appropriate. In this manner, the types of the first slits to be combined can be increased, and the cogging torque, the torque ripple, and the harmonic components of the electromagnetic excitation force can be further reduced.

Further, the above-mentioned third embodiment is applied to the rotating electric machine to be used for the power running operation, in which the first slit tilts to the forward side in the rotating direction, but the above-mentioned third embodiment may be applied to the rotating electric machine to be used for the regeneration operation, in which the first slit tilts to the backward side in the rotating direction.

Fourth Embodiment

Figure 19:
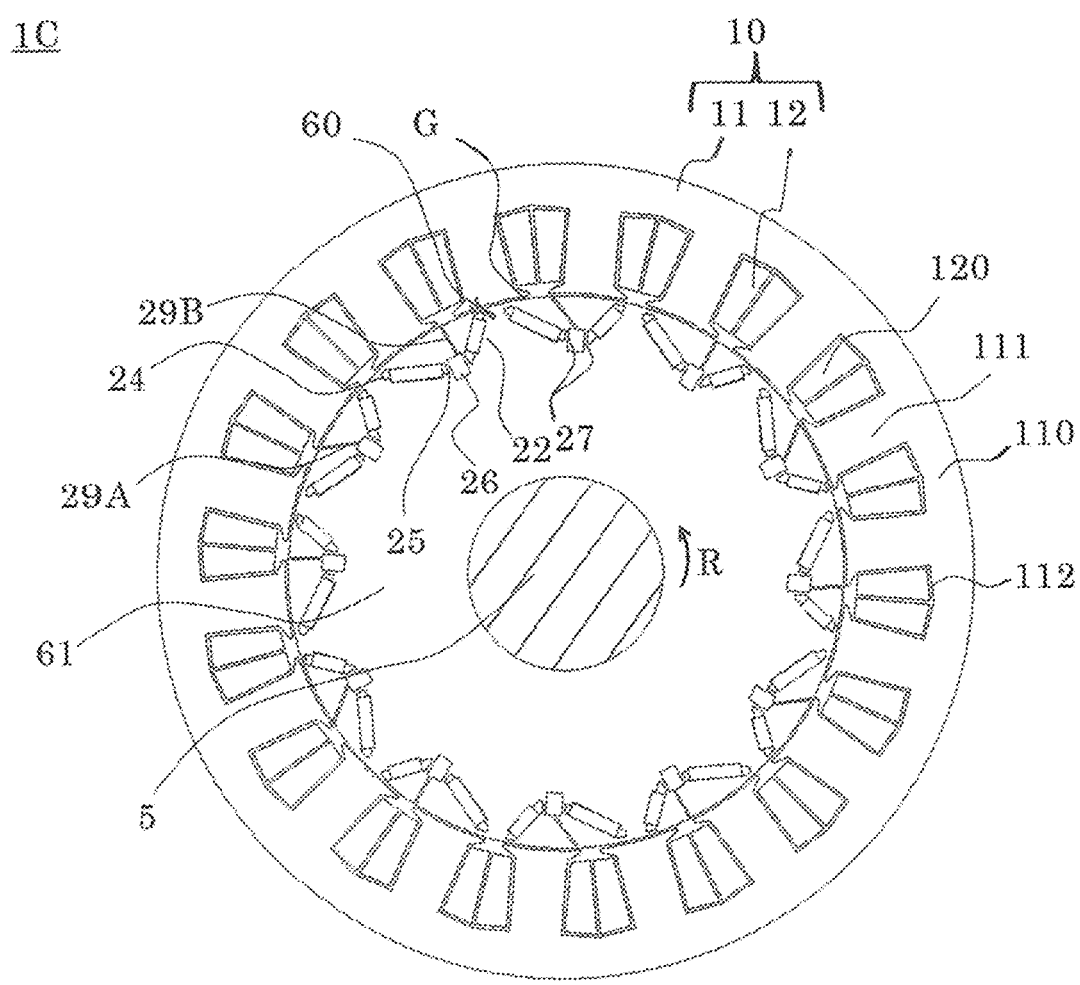
FIG. 19 is a transverse sectional view for illustrating a rotating electric machine according to a fourth embodiment of the present invention.

FIG. 19 is a transverse sectional view for illustrating a rotating electric machine according to a fourth embodiment of the present invention.

In FIG. 19, a rotating electric machine 1C includes the stator 10 and a rotor 60. The rotor 60 is arranged on the radially inner side of the stator 10 and coaxially with the stator 10 with a gap G formed between the stator 10 and the rotor 60. The rotor 60 includes a rotor core 61. Although not shown, the stator 10 and the rotor 60 are accommodated in the housing formed of the frame 2 and the pair of end plates 3.

In the rotor core 61, the first slit 29A and the first slit 29B are alternately formed for every magnetic pole in core regions on the radially outer side of pairs of permanent magnets 22 each forming one magnetic pole and each being arranged in the V-shape. Other configurations are similar to those of the rotor 50 in the third embodiment.

In the fourth embodiment, the first slit 29A and the first slit 29B are alternately formed for every magnetic pole so as to tilt to the forward side in the rotating direction R so as to tilt to the forward side in the rotating direction R. Thus, also in the fourth embodiment, at the time of the power running operation, the combined torque of the magnet torque and the reluctance torque is improved. Further, the end portion of each of the first slit 29A and the first slit 29B on the radially inner side is positioned in the region sandwiched between the extension lines of the pair of ribs 27. Thus, also in the fourth embodiment, the stress generated in the rotor core 61 is reduced.

In the fourth embodiment, the first slit 29A and the first slit 29B alternately formed for every magnetic pole have different shapes and different arrangements. That is, the first slit 29A and the first slit 29B having different shapes and different arrangements are formed in a dispersed manner in the circumferential direction. Thus, also in the fourth embodiment, when the first slit 29A and the first slit 29B having different shapes and different arrangements are combined as appropriate, the cogging torque, the torque ripple, and the harmonic components of the electromagnetic excitation force can be canceled out. In this manner, the cogging torque, the torque ripple, and the harmonic components of the electromagnetic excitation force can be reduced.

In the above-mentioned fourth embodiment, two types of first slits have different shapes and different arrangements, but it is only required that the two types of first slits have at least one of different shapes or different arrangements.

Further, in the above-mentioned fourth embodiment, the two types of first slits are formed in the rotor core alternately for every magnetic pole, but the two types of first slits may be formed in the rotor core alternately for every plurality of poles, or formed in the rotor core alternately for different numbers of magnetic poles.

Further, in the above-mentioned fourth embodiment, the two types of first slits are formed in the rotor core, but three or more types of first slits may be formed in the rotor core.

Further, also in the fourth embodiment, similarly to the above-mentioned first embodiment, as long as the end portion of the first slit on the radially inner side is positioned between the extension lines of the pair of ribs, the shape and arrangement of the first slit and the number of permanent magnets can be changed as appropriate.

Further, in the above-mentioned fourth embodiment, a single rotor core is used, but similarly to the above-mentioned third embodiment, rotor cores divided in the axial direction may be used.

Here, the above-mentioned fourth embodiment is applied to the rotating electric machine to be used for the power running operation, in which the first slit tilts to the forward side in the rotating direction, but the above-mentioned third embodiment may be applied to the rotating electric machine to be used for the regeneration operation, in which the first slit tilts to the backward side in the rotating direction.

Fifth Embodiment

Figure 20:
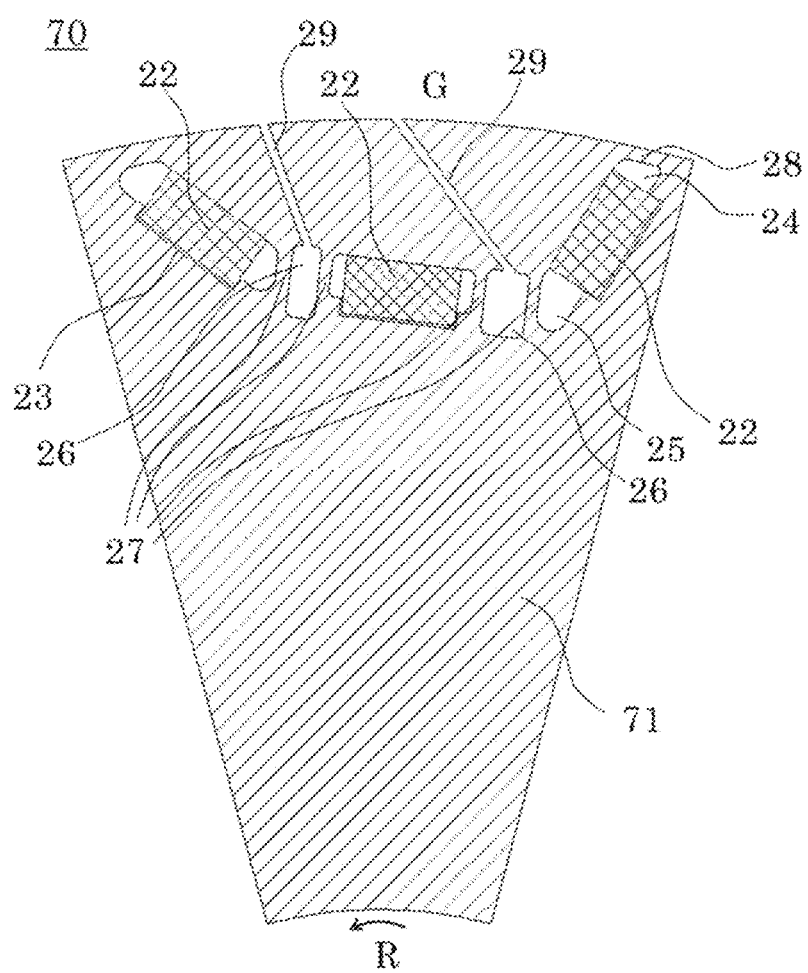
FIG. 20 is a main-part transverse sectional view for illustrating a part around one magnetic pole of a rotor in a rotating electric machine according to a fifth embodiment of the present invention.

FIG. 20 is a main-part transverse sectional view for illustrating a part around one magnetic pole of a rotor in a rotating electric machine according to a fifth embodiment of the present invention.

In FIG. 20, in a rotor core 71 of a rotor 70, three magnet insertion holes 23 holding the permanent magnets 22 forming one magnetic pole are formed in a V-shape in which their interval in the circumferential direction is gradually increased toward the radially outer side. That is, two magnet insertion holes 23 are arrayed in one row while tilting to the forward side in the rotating direction. The remaining one magnet insertion hole 23 tilts to the backward side in the rotating direction. The first flux barrier 24 and the second flux barrier 25 are formed at both ends of each magnet insertion hole 23 in the length direction of the long side of the rectangular cross-section thereof. The third flux barrier 26 is formed between each pair of adjacent magnet insertion holes 23. A pair of ribs 27 is formed across each of the third flux barriers 26. The first slit 29 is formed in the rotor core 71 so as to be opened to each of the third flux barriers 26 and the air gap G.

Other configurations are similar to those in the above-mentioned first embodiment.

In the fifth embodiment, the third flux barrier 26 is formed between each set of permanent magnets 22 adjacent to each other in the circumferential direction among the three permanent magnets 22 forming one magnetic pole and being arranged in the V-shape. Two slits 29 are formed in the region of the rotor core 71 on the radially outer side of the three permanent magnets 22 forming one magnetic pole and being arranged in the V-shape. The two slits 29 linearly extend so as to tilt to the forward side in the rotating direction R. An end portion of one slit 29 on the radially inner side is positioned between the extension lines of the pair of ribs 27 formed across, in the circumferential direction, the third flux barrier 26 formed between one set of permanent magnets 22 adjacent to each other in the circumferential direction. An end portion of the other slit 29 on the radially inner side is positioned between the extension lines of the pair of ribs 27 formed across, in the circumferential direction, the third flux barrier 26 formed between the other set of permanent magnets 22 adjacent to each other in the circumferential direction.

Therefore, also in the fifth embodiment, effects similar to those in the above-mentioned first embodiment can be obtained.

In the fifth embodiment, three permanent magnets 22 form one magnetic pole. Thus, when the centrifugal force acts on the permanent magnet 22, a stress acting on the rotor core 71 is dispersed. In this manner, the stress generated in the rotor core 71 is reduced as compared to the case in which one third flux barrier 26 is formed. Further, two first slits 29 are formed, and hence a relatively high torque can be obtained as compared to the case in which one first slit 29 is formed.

Also in the fifth embodiment, similarly to the above-mentioned first and fourth embodiments, as long as the end portion of the first slit on the radially inner side is positioned between the extension lines of the pair of ribs, the shape and arrangement of the first slit and the number of permanent magnets can be changed as appropriate.

Further, in the above-mentioned fifth embodiment, a single rotor core is used, but similarly to the above-mentioned third embodiment, rotor cores divided in the axial direction may be used.

Further, the fifth embodiment is applied to the rotating electric machine to be used for the power running operation, in which the first slit tilts to the forward side in the rotating direction, but the fifth embodiment may be applied to the rotating electric machine to be used for the regeneration operation, in which the first slit tilts to the backward side in the rotating direction.

Sixth Embodiment

Figure 21:
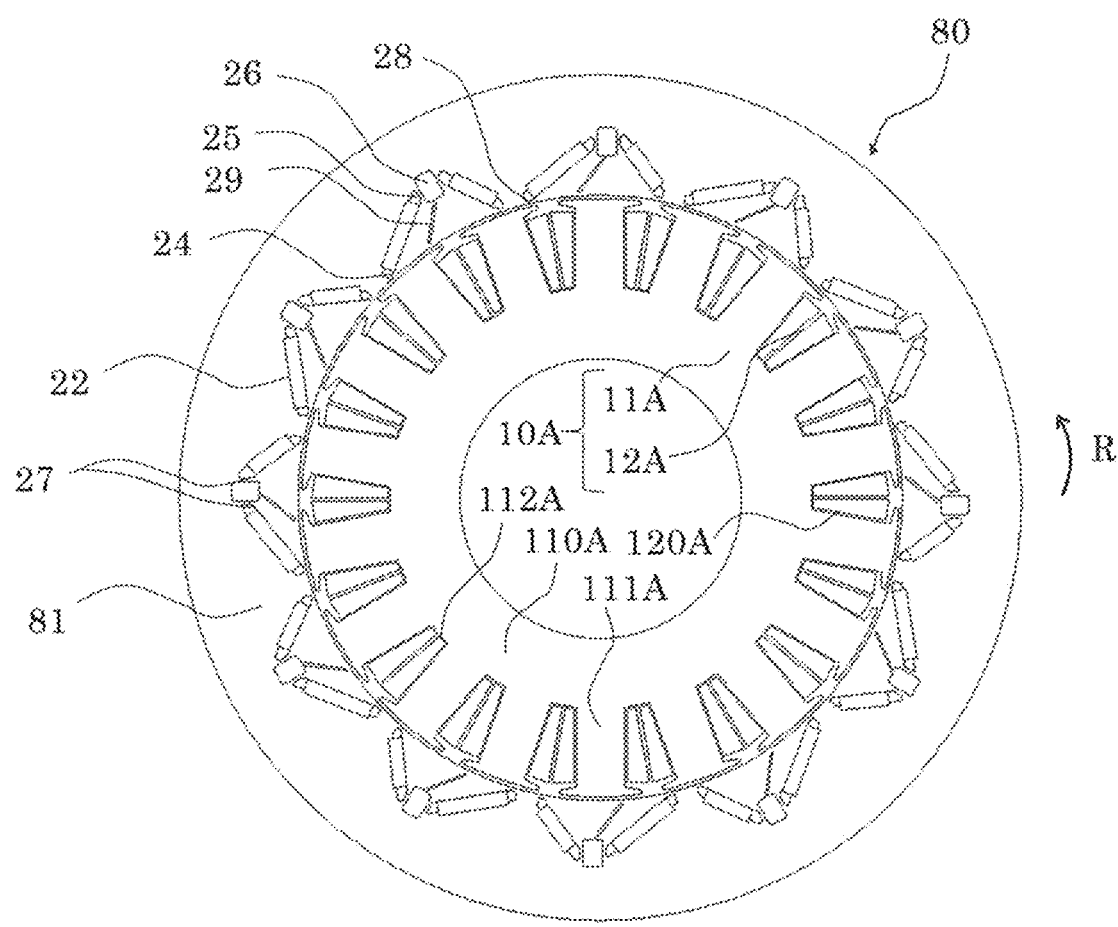
FIG. 21 is a transverse sectional view for illustrating a rotating electric machine according to a sixth embodiment of the present invention.

FIG. 21 is a transverse sectional view for illustrating a rotating electric machine according to a sixth embodiment of the present invention.

In FIG. 21, a rotating electric machine 1D includes a stator 10A and a rotor 80. The rotor 80 is arranged on the radially outer side of the stator 10A with a gap G formed between the stator 10A and the rotor 80.

The stator 10A includes an annular stator core 11A, and a stator coil 12A mounted to the stator core 11A. The stator core 11A includes an annular core back 110A, and a plurality of teeth 111A projecting from an outer peripheral surface of the core back 110A outward in the radial direction. Eighteen teeth 111A are arrayed at equiangular pitches in the circumferential direction, and a region between adjacent teeth 111A serves as a slot 112A. The stator coil 12A is formed of concentrated-winding coils 120A each formed by winding a conductive wire around corresponding one of the teeth 111A.

The rotor 80 includes a rotor core 81, and twenty-four permanent magnets 22 embedded on the radially inner side of the rotor core 81. Twelve pairs of magnet insertion holes 23 passing through the rotor core 81 in the axial direction are formed at equiangular pitches on the radially inner side of the rotor core 81. The magnet insertion holes 23 are each formed into a hole shape having a rectangular cross-section. Each pair of magnet insertion holes 23 is formed in a V-shape so that an interval in the circumferential direction is gradually increased toward the radially inner side. The magnet insertion holes 23 are each formed into a hole shape having a rectangular cross-section. End portions on the radially outer side of the magnet insertion holes 23 forming a pair are separated away from each other in the circumferential direction.

The permanent magnets 22 are each formed as a prismatic body having a rectangular cross-section equivalent to that of the magnet insertion hole 23. The permanent magnets 22 are each magnetized so as to have magnetization orthogonal to a surface defined by a long side of the rectangular cross-section. In this manner, a first surface of the permanent magnet 22 defined by the long side of the rectangular cross-section thereof has an N pole, and a second surface thereof on the opposite side of the first surface has an S pole. The permanent magnets 22 are inserted and held in each pair of magnet insertion holes 23 so that surfaces having the same polarity are directed to the radially inner side, and are inserted and held in adjacent pairs of magnet insertion holes 23 so that surfaces having different polarities are directed to the radially inner side. That is, each pair of permanent magnets 22 arranged in a V-shape in which an interval in the circumferential direction is gradually increased toward the air gap G side forms one magnetic pole. Then, twelve pairs of permanent magnets 22 each forming one magnetic pole are embedded on the radially outer side of the rotor core 21 to be arrayed at equiangular pitches in the circumferential direction. In this manner, the rotor 20 has twelve magnetic poles.

The first flux barrier 24 is formed by projecting a surface on the radially inner side of each magnet insertion hole 23, which is defined by a short side of the rectangular cross-section thereof, in a length direction of the long side of the rectangular cross-section of the magnet insertion hole 23. The second flux barrier 25 is formed by projecting a surface on the radially outer side of each magnet insertion hole 23, which is defined by a short side of the rectangular cross-section thereof, in the length direction of the long side of the rectangular cross-section of the magnet insertion hole 23. The third flux barrier 26 is formed at a position between the second flux barriers 25 of the pair of magnet insertion holes 23. Each of the first, second, and third flux barriers 24, 25, and 26 is formed to pass through the rotor core 21 in the axial direction.

In this case, parts of the second flux barrier 25 and the third flux barrier 26 adjacent to each other in the circumferential direction are positioned at the same radial distance from the axial center of the rotor. At this position, a core region between the second flux barrier 25 and the third flux barrier 26 serves as the rib 27. Further, a core region between the first flux barrier 24 and an inner peripheral surface of the rotor core 21 serves as the bridge 28.

The first slit 29 is formed in a core region of the rotor core 81 positioned on the radially inner side of the pair of permanent magnets 22 arranged in the V-shape, that is, the air gap G side. The first slit 29 extends in a linear band shape from the third flux barrier 26 to reach the vicinity of the inner peripheral surface of the rotor core 81. The first slit 29 linearly extends while tilting to the front side in the rotating direction R. An end portion of the first slit 29 on the radially outer side, that is, an end portion thereof on the third flux barrier 26 side is positioned between the extension lines of the pair of ribs 27. An end portion of the first slit 29 on the radially inner side, that is, an end portion thereof on the air gap G side is positioned in the vicinity of the inner peripheral surface of the rotor core 81.

In the rotating electric machine 1D configured as described above, the number of the slots 112A of the stator 10A is eighteen, and the number of poles of the rotor 80 is twelve. That is, the rotating electric machine 1D is an outer rotor-type rotating electric machine employing a system in which a ratio of the number of poles to the number of slots is 2:3. The rotating electric machine 1D is assumed to be used for a power running operation.

In the sixth embodiment, the first slit 29 is formed in the core region on the radially inner side of the pair of permanent magnets 22 arranged in the V-shape so as to tilt to the forward side in the rotating direction R. The end portion of the first slit 29 on the radially inner side is positioned between the extension lines of the pair of ribs 27 formed across the third flux barrier 26. Therefore, also in the sixth embodiment, effects similar to those in the above-mentioned first embodiment can be obtained.

Also in the sixth embodiment, similarly to the above-mentioned first, fourth, and fifth embodiments, as long as the end portion of the first slit on the radially outer side is positioned between the extension lines of the pair of ribs, the shape and arrangement of the first slit and the number of permanent magnets can be changed as appropriate.

Further, in the above-mentioned sixth embodiment, a single rotor core is used, but similarly to the above-mentioned third embodiment, rotor cores divided in the axial direction may be used.

Further, the sixth embodiment is applied to the rotating electric machine to be used for the power running operation, in which the first slit tilts to the forward side in the rotating direction, but the sixth embodiment may be applied to the rotating electric machine to be used for the regeneration operation, in which the first slit tilts to the backward side in the rotating direction.

In the above-mentioned embodiments, each of the stator core and the rotor core is formed of stacked cores obtained by stacking electromagnetic steel plates, but each of the stator core and the rotor core may be formed of a block core formed of a block magnetic body.

Further, in the above-mentioned embodiments, the stator coil is formed of concentrated-winding coils, but the stator coil may be formed of distributed-winding coils.

Further, in the above-mentioned embodiments, the description has been given of the rotating electric machine employing a system of twelve poles and eighteen slots, that is, a system of 2:3. However, the ratio of the number of poles to the number of slots in the rotating electric machine is not limited to 2:3, and may be, for example, 8:9 or 10:12. The system of 8:9 or 10:12 has an effect of increasing the winding factor as compared to the system of 2:3, and can improve the torque and suppress a torque pulsation.

Further, in the above-mentioned embodiments, the second flux barrier is formed on the third flux barrier side of each of the magnet insertion holes positioned on both sides of the third flux barrier in the circumferential direction, but it is only required that the second flux barrier be formed on the third flux barrier side of the magnet insertion hole positioned on a first side of the third flux barrier in the circumferential direction.

Although the present invention is specifically described above with reference to the preferred embodiments, it is apparent that persons skilled in the art may adopt various modifications based on the basic technical concepts and teachings of the present invention.

REFERENCE SIGNS LIST

10, 10A stator, 11, 11A stator core, 12, 12A stator coil, 20, 20A, 20B, 20C, 20D, 20E, 50, 60, 70, 80 rotor, 21, 21A, 21B, 21C, 21D, 21E, 61, 71, 81 rotor core, 22 permanent magnets, 29, 29a, 29b first slit, 29A first slit, 29B first slit, 33 second slit, 51A first divided rotor core, 51B second divided rotor core, 112, 112A slot, G air gap

The invention claimed is:

1. A rotating electric machine, comprising:
a stator including a stator core and a stator coil; and
a rotor including:
a rotor core arranged coaxially with the stator core via an air gap formed between the stator core and the rotor core; and
a plurality of permanent magnet groups each forming one magnetic pole, the plurality of permanent magnet groups being embedded in the rotor core and arranged at equiangular pitches in a circumferential direction,
wherein a flux barrier is formed between one set of permanent magnets adjacent to each other in the circumferential direction in each permanent magnet group forming one magnetic pole,
wherein a pair of ribs is formed of regions of the rotor core between the flux barrier and the one set of permanent magnets adjacent to each other,
wherein a first slit for causing a magnetic flux generated from the each permanent magnet group forming one magnetic pole to deviate in a rotating direction of the rotor is formed in a region of the rotor core on an air gap side in a radial direction of the each permanent magnet group forming one magnetic pole,
wherein an end portion of the first slit on a flux barrier side is positioned between extension lines of the pair of ribs, and
wherein a distance between the end portion of the first slit on the flux barrier side and the flux barrier is smaller than a distance between the end portion of the first slit on the flux barrier side and each of the one set of permanent magnets adjacent to each other.

2. The rotating electric machine according to claim 1, wherein the first slit and the flux barrier are connected to each other.

3. The rotating electric machine according to claim 1, wherein a magnet end flux barrier is formed between corresponding one of the one set of permanent magnets adjacent to each other and corresponding one of the pair of ribs.

4. The rotating electric machine according to claim 1,
wherein the each permanent magnet group forming one magnetic pole is arranged in a V-shape in which an interval in the circumferential direction is gradually increased toward the air gap side, and
wherein the flux barrier is formed at a valley portion of the each permanent magnet group foiling one magnetic pole arranged in the V-shape.

5. The rotating electric machine according to claim 1, wherein the stator coil is a concentrated-winding coil.

6. The rotating electric machine according to claim 1, wherein the first slit tilts in a direction of a circumferential force acting on the rotor when the stator coil is energized.

7. The rotating electric machine according to claim 1, wherein the each permanent magnet group forming one magnetic pole is formed of two permanent magnets.

8. The rotating electric machine according to claim 1,
wherein the first slit comprises a plurality of types of first slits having at least one of different shapes or different arrangements, and
wherein the plurality of types of first slits are formed in a dispersed manner in the circumferential direction.

9. The rotating electric machine according to claim 1, wherein a second slit is formed in a region of the rotor core on the air gap side in the radial direction of the each permanent magnet group forming one magnetic pole, the region being located on a forward side in the rotating direction of the rotor with respect to the first slit.

10. The rotating electric machine according to claim 1, wherein the first slit has a minimum width portion that is narrower than a width of each of the pair of ribs in the circumferential direction.

11. The rotating electric machine according to claim 1, wherein a ratio of the number of poles of the rotor to the number of slots of the stator is 2:3.

12. The rotating electric machine according to claim 1, wherein the end portion of the first slit on the flux barrier side is positioned within a circumferential region between the extension lines of the pair of ribs.

13. The rotating electric machine according to claim 1, wherein the end portion of the first slit on the flux barrier side is positioned within a circumferential region of the rotor core between the extension lines obtained by extending the pair of ribs to the air gap side.

14. The rotating electric machine according to claim 1, wherein the end portion of the first slit on the flux barrier side extends toward the flux barrier.

15. The rotating electric machine according to claim 1, wherein the end portion of the first slit on the air gap side is positioned outside a circumferential region between the extension lines of the pair of ribs.

16. A rotating electric machine, comprising:
a stator including a stator core and a stator coil; and
a rotor including:
a rotor core arranged coaxially with the stator core via an air gap formed between the stator core and the rotor core; and
a plurality of permanent magnet groups each forming one magnetic pole, the plurality of permanent magnet groups being embedded in the rotor core and arranged at equiangular pitches in a circumferential direction,
wherein a flux barrier is formed between one set of permanent magnets adjacent to each other in the circumferential direction in each permanent magnet group forming one magnetic pole,
wherein a pair of ribs is formed of regions of the rotor core between the flux barrier and the one set of permanent magnets adjacent to each other,
wherein a first slit for causing a magnetic flux generated from the each permanent magnet group forming one magnetic pole to deviate in a rotating direction of the rotor is formed in a region of the rotor core on the air gap side in a radial direction of the each permanent magnet group forming one magnetic pole,
wherein an end portion of the first slit on the flux barrier side is positioned between extension lines of the pair of ribs,
wherein the rotor core includes a plurality of divided rotor cores divided in an axial direction,
wherein for each divided rotor core, first slits within the divided rotor core have a same shape and a same arrangement, and
wherein the first slits in one divided rotor core have a shape and arrangement that is different from the first slits in another divided rotor core.

* * * * *